US012686925B2

(12) United States Patent
Vonk et al.

(10) Patent No.: US 12,686,925 B2
(45) Date of Patent: Jul. 21, 2026

(54) BISMUTH COMPOSITIONS FOR METAL PRETREATMENT APPLICATIONS

(71) Applicant: Henkel AG & Co. KGaA, Duesseldorf (DE)

(72) Inventors: Donald Robb Vonk, Clinton Township, MI (US); Brian J. Marvin, Oakland, MI (US); John L. Zimmerman, Taylor, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 701 days.

(21) Appl. No.: 17/815,607

(22) Filed: Jul. 28, 2022

(65) Prior Publication Data

US 2022/0364240 A1      Nov. 17, 2022

Related U.S. Application Data

(63) Continuation of application No. PCT/US2021/017851, filed on Feb. 12, 2021.

(60) Provisional application No. 62/976,660, filed on Feb. 14, 2020.

(51) Int. Cl.
| | |
|---|---|
| *C23C 22/06* | (2006.01) |
| *C08K 3/08* | (2006.01) |
| *C08K 3/22* | (2006.01) |
| *C08K 5/092* | (2006.01) |
| *C09D 1/00* | (2006.01) |
| *C23C 22/73* | (2006.01) |
| *C23C 22/78* | (2006.01) |
| *C23C 22/82* | (2006.01) |

(52) U.S. Cl.
CPC ................ *C23C 22/06* (2013.01); *C08K 3/08* (2013.01); *C08K 3/22* (2013.01); *C08K 5/092* (2013.01); *C09D 1/00* (2013.01); *C23C 22/73* (2013.01); *C23C 22/78* (2013.01); *C23C 22/82* (2013.01); *C08K 2003/085* (2013.01)

(58) Field of Classification Search
CPC ...... C09D 1/00; C08K 2003/085; C08K 3/08; C08K 3/22; C08K 5/092
See application file for complete search history.

(56) References Cited

U.S. PATENT DOCUMENTS

| | | | |
|---|---|---|---|
| 2,323,424 A | 7/1943 | Schore | |
| 3,314,811 A | 4/1967 | Mitchell et al. | |
| 3,615,892 A | 10/1971 | Edward et al. | |
| 3,615,897 A | 10/1971 | Russel | |
| 3,932,198 A | 1/1976 | Schneider | |
| 4,357,367 A | 11/1982 | Comberg et al. | |
| 4,963,596 A | 10/1990 | Lindert et al. | |
| 5,603,818 A | 2/1997 | Brent et al. | |
| 5,631,091 A | 5/1997 | Piano | |
| 5,891,952 A | 4/1999 | McCormick et al. | |
| 6,331,201 B1 | 12/2001 | McGrath et al. | |
| 6,624,215 B1 | 9/2003 | Hiraki et al. | |
| 9,039,882 B2 | 5/2015 | Kawagoshi et al. | |
| 9,920,205 B2 | 3/2018 | Wapner et al. | |
| 10,407,578 B2 | 9/2019 | Czika et al. | |
| 10,435,805 B2 | 10/2019 | Markou et al. | |
| 2002/0056642 A1 | 5/2002 | Ikenoue et al. | |
| 2006/0269760 A1 | 11/2006 | Sugama | |
| 2009/0169903 A1 | 7/2009 | Kubota | |
| 2011/0293741 A1 | 12/2011 | Kawamukai et al. | |
| 2015/0013566 A1* | 1/2015 | Kawagoshi | C23C 22/50 556/77 |
| 2016/0201199 A1* | 7/2016 | Frey | C23C 22/73 148/247 |
| 2018/0275287 A1 | 9/2018 | Itaya et al. | |
| 2019/0145009 A1* | 5/2019 | Volk | C23C 22/34 148/247 |

FOREIGN PATENT DOCUMENTS

| | | |
|---|---|---|
| CN | 1405354 A | 3/2003 |
| CN | 101691666 A | 4/2010 |
| CN | 201515812 U | 6/2010 |
| CN | 101876070 A | 11/2010 |
| CN | 102140635 A | 8/2011 |
| CN | 102228837 A | 11/2011 |
| CN | 102409336 A | 4/2012 |
| CN | 103174032 A | 6/2013 |
| CN | 103805970 A | 5/2014 |
| CN | 104060262 A | 9/2014 |
| CN | 104630757 A | 5/2015 |
| CN | 104823114 A | 8/2015 |
| CN | 105769982 A | 7/2016 |
| CN | 105985711 A | 10/2016 |
| CN | 106119826 A | 11/2016 |
| CN | 107969133 A | 4/2018 |
| CN | 107999781 A | 5/2018 |
| CN | 108002389 A | 5/2018 |

(Continued)

OTHER PUBLICATIONS

International Search Report for PCT/US2021/017851 mailed May 24, 2021.

*Primary Examiner* — Nicholas A Wang
(74) *Attorney, Agent, or Firm* — Mary K. Cameron

(57) ABSTRACT

Provided are bismuth conversion coating compositions that deposit bismuth conversion coatings on a variety of metal substrates, methods of making bismuth conversion coating compositions, methods of depositing bismuth conversion coatings on metal substrates and articles of manufacture having metal surfaces comprising a bismuth conversion coating.

19 Claims, No Drawings

(56) References Cited

FOREIGN PATENT DOCUMENTS

| | | | |
|----|----|----|----|
| CN | 109023324 | A | 12/2018 |
| CN | 109231273 | A | 1/2019 |
| CN | 109504264 | A | 3/2019 |
| CN | 110935575 | A | 3/2020 |
| CN | 112376094 | A | 2/2021 |
| CN | 114583058 | A | 6/2022 |
| DE | 2516611 | A1 | 11/1975 |
| DE | 2452446 | A1 | 5/1976 |
| DE | 102014016776 | A1 | 5/2016 |
| EP | 0716429 | A2 | 6/1996 |
| EP | 0806780 | A1 | 11/1997 |
| EP | 1083246 | A1 | 3/2001 |
| EP | 2382275 | B1 | 8/2014 |
| EP | 2883981 | A1 | 6/2015 |
| EP | 3029179 | A1 | 6/2016 |
| EP | 3071652 | B1 | 12/2017 |
| EP | 3071659 | B1 | 12/2017 |
| EP | 3080214 | B1 | 8/2018 |
| EP | 3071656 | B1 | 5/2019 |
| JP | S61279675 | A | 12/1986 |
| JP | S63161176 | A | 7/1988 |
| JP | H02282485 | A | 11/1990 |
| JP | 2915093 | B2 | 7/1999 |
| JP | 2001049196 | A | 2/2001 |
| JP | 2002339099 | A | 11/2002 |
| JP | 2003342100 | A | 12/2003 |
| JP | 2006169605 | A | 6/2006 |
| JP | 2007045958 | A | 2/2007 |
| JP | 2011058032 | A | 3/2011 |
| JP | 5290079 | B2 | 9/2013 |
| JP | 2015187199 | A | 10/2015 |
| JP | 2015209585 | A | 11/2015 |
| JP | 2017048449 | A | 3/2017 |
| JP | 6334048 | B1 | 5/2018 |
| JP | 2020021855 | A | 2/2020 |
| KR | 1020110133581 | A | 12/2011 |
| KR | 20120072886 | A | 7/2012 |
| KR | 1020200117658 | A | 10/2020 |
| WO | 0171058 | A1 | 9/2001 |
| WO | 0171059 | A1 | 9/2001 |
| WO | 02087339 | A1 | 11/2002 |
| WO | 2010071753 | A1 | 6/2010 |
| WO | 2012108292 | A1 | 8/2012 |
| WO | 2013150533 | A2 | 10/2013 |
| WO | 2013167596 | A1 | 11/2013 |
| WO | 2015013228 | A2 | 1/2015 |
| WO | 2015121682 | A1 | 8/2015 |
| WO | 2016167928 | A1 | 10/2016 |
| WO | 2016196688 | A1 | 12/2016 |
| WO | 2017038430 | A1 | 3/2017 |
| WO | 2018119368 | A1 | 6/2018 |
| WO | 2020131443 | A1 | 6/2020 |

* cited by examiner

BISMUTH COMPOSITIONS FOR METAL PRETREATMENT APPLICATIONS

FIELD OF THE INVENTION

The present invention relates to bismuth compositions, e.g. conversion coating compositions for metal pretreatment applications, for example deposition on metal surfaces to improve corrosion resistance and/or paint adhesion, methods of making said compositions, methods of coating metal substrates and articles of manufacture having metal surfaces coated with the compositions.

BACKGROUND OF THE INVENTION

Many consumer and industrial goods are formed from metal substrates and are exposed to the elements. As such, these metal goods are subject to corrosive environments; thus, they are often coated in protective coatings, including anti-corrosion coatings and paints. Many such anti-corrosion coatings are known as conversion coatings, which are understood in the art to be coatings formed by contacting a metallic surface with a reactive coating composition thereby forming a conversion coating thereon. While these conversion coatings enhance the corrosion resistance of metal, the further improvement of conversion coatings is an ongoing market requirement for automotive and white goods applications.

A typical process for applying a conversion coating layer onto a metal substrate involves steps of cleaning, rinsing, depositing the conversion coating, and optional post-rinsing and/or sealing. The metal substrate at least partially coated with a conversion coating layer is then most often subjected to a painting step (such as by electrophoretic coating, also known as E-coating).

Traditional tri-cationic zinc phosphate conversion coating systems provide excellent corrosion resistance and paint adhesion, but contain undesirable heavy metals and generate environmentally harmful waste via precipitation of heavy metal phosphate sludges. These sludges contain high concentrations of phosphate ion, as do overflows from zinc phosphate baths, both of which can contribute to eutrophication of natural water supplies. The zinc phosphate baths are also operated at elevated temperature requiring increased energy usage. Thus, it would be desirable to reduce or avoid the disadvantages of zinc phosphate processes, while still achieving comparable corrosion resistance and paint adhesion. Zirconium-based conversion coatings have been suggested as replacements for tri-cationic zinc phosphate, but in some uses these conversion coatings do not meet industry requirements, in particular the automotive industry requirements.

Accordingly, the development of alternative conversion coatings and methods would be highly desirable.

SUMMARY OF THE INVENTION

Bismuth conversion coating compositions have been developed that deposit bismuth conversion coatings on metal substrates. Metal substrates, pre-treated with an aqueous bismuth conversion coating composition followed by application of paint, in particular E-coat paint, exhibit improved to equivalent corrosion resistance and paint adhesion compared to a tri-cationic zinc phosphate control.

The bismuth conversion coating compositions may be applied to metal surfaces of substrates through dipping (immersion) the metal substrate into the aqueous solution or spraying the solution onto the metal substrate. Alternatively, the coating compositions can be applied by roll-coating or other known conversion coating deposition methods.

Preferred embodiments of the bismuth conversion coating compositions provide bismuth conversion coatings with corrosion resistance and paint adhesion properties comparable to traditional tri-cationic zinc phosphate compositions, and provide improvements in reduced environmental impact due to: absence of added heavy metals, e.g. Zn, Ni and Mn; absence of phosphorus, and reduced operating temperature.

Some uses for the bismuth conversion coating compositions include coating metal substrate surfaces, e.g. ferrous, zinciferous, aluminiferous surfaces and combinations thereof, which are to be subsequently painted and require paint adhesion and corrosion resistance. Suitable applications may include transportation, such as automotive OEM (body-in-white), automotive components; energy industries, e.g. wind and solar equipment; agricultural and construction equipment; recreational vehicles; architectural; household goods, such as appliances; office furniture; metal coils; metal containers, and the like.

According to one aspect of the present invention ("Aspect 1"), a conversion coating composition is provided which is comprised of, consists essentially of, or consists of an acidic aqueous bismuth conversion coating composition comprising:

A) dissolved and/or dispersed bismuth;

B) at least one water-soluble organic chelating agent present in an amount sufficient to solubilize or disperse A);

C) dissolved copper ions; and having a pH in a range of from about 2.0 to about 6.

Aspect 2: The acidic aqueous bismuth conversion coating composition as recited in Aspect 1, wherein A) comprises at least one of dissolved Bi(III) and dissolved and/or dispersed bismuth compounds; B) comprises one or more water soluble organic acids and salts thereof.

Aspect 3: The acidic aqueous bismuth conversion coating composition as recited in Aspect 2, wherein the one or more water soluble organic acids and salts thereof are selected from aliphatic or aromatic; linear, branched or cyclic; saturated or unsaturated C3-C12 organic acids and salts thereof.

Aspect 4: The acidic aqueous bismuth conversion coating composition as recited in Aspect 2, wherein the one or more water soluble organic acids and salts thereof comprise at least one organic polycarboxylic acid and salts thereof.

Aspect 5: The acidic aqueous bismuth conversion coating composition as recited in Aspect 4, wherein the at least one organic polycarboxylic acid and salts thereof comprises substituted and/or unsubstituted alpha-omega-dicarboxylic acids Aspect 6: The acidic aqueous bismuth conversion coating composition as recited in Aspect 5, wherein the substituted and/or unsubstituted alpha-omega-dicarboxylic acids and salts thereof comprise one or more of substituted and/or unsubstituted propanedioic acid, butanedioic acid, pentanedioic acid, hexanedioic acid, heptanedioic acid, octanedioic acid, nonanedioic acid, decanedioic acid and salts thereof.

Aspect 7: The acidic aqueous bismuth conversion coating composition as recited in Aspect 2, wherein the one or more water soluble organic carboxylic acids and salts thereof comprises tartaric acid and salts thereof.

Aspect 8: The acidic aqueous bismuth conversion coating composition as recited in Aspect 1, comprising less than 1 wt. % phosphorus-containing acids and or salts thereof and less than 1 wt. % nickel.

Aspect 9: The acidic aqueous bismuth conversion coating composition as recited in Aspect 1, comprising one or more additional components selected from the group consisting of a source of free fluoride, nitrate and Si-based substances.

Aspect 10: The acidic aqueous bismuth conversion coating composition as recited in Aspect 1, wherein the acidic aqueous bismuth conversion coating composition comprises at least one pH adjuster and has a pH of about 2.5 to about 5.0.

Aspect 11: The acidic aqueous bismuth conversion coating composition as recited in Aspect 1, wherein the dissolved and/or dispersed bismuth is present in a total concentration of from about 5 to 10,000 ppm.

Aspect 12: The acidic aqueous bismuth conversion coating composition as recited in Aspect 1, wherein the dissolved and/or dispersed bismuth comprises one or more of nitrates, oxides and hydroxides of bismuth.

Aspect 13: The acidic aqueous bismuth conversion coating composition as recited in Aspect 1, wherein the dissolved and/or dispersed bismuth is selected from bismuth nitrate; bismuth nitrate pentahydrate; bismuth subnitrate; bismuth oxide; bismuth hydroxide and combinations thereof.

Aspect 14: The acidic aqueous bismuth conversion coating composition as recited in Aspect 1, wherein the at least one water-soluble organic chelating agent is present in a total concentration of from about 50 to 100,000 ppm.

Another aspect of the invention (Aspect 15) which is comprised of, consists essentially of, or consists of a replenisher composition for replenishing the acidic aqueous bismuth conversion coating composition as described above after use comprising a storage stable composition comprising bismuth, copper, nitric acid and optionally nitrate.

Another aspect of the invention (Aspect 16) which is comprised of, consists essentially of, or consists of a method of depositing a bismuth conversion coating on a substrate having a metal surface, comprising steps of:

a. contacting a metal surface of a substrate, preferably selected from ferrous metal, zinciferous metal and aluminiferous metal, with the acidic aqueous bismuth conversion coating composition as described above for a time sufficient to form a bismuth conversion coating layer on at least a portion of the metal surface; and b. rinsing the bismuth conversion coating layer with a rinse comprising water.

Aspect 17: The method of depositing a bismuth conversion coating of Aspect 16 further comprising a step c) coating at least a portion of the metal surfaces having the bismuth conversion coating layer with cathodically depositable electrophoretic-dipcoating and wherein after rinsing step b) and before being coated with the cathodically depositable electrophoretic-dipcoating, the metal surfaces are not dried.

Another aspect of the invention (Aspect 18) which is comprised of, consists essentially of, or consists of a substrate having a metal surface comprising a bismuth conversion coating layer deposited thereon, wherein the bismuth conversion coating layer comprises bismuth oxide and/or bismuth hydroxide, and further comprises at least one of elemental Cu, Cu(I) and Cu (II).

According to yet another aspect of the present invention (Aspect 19), a conversion coating composition is provided which is comprised of, consists essentially of, or consists of an acidic aqueous bismuth conversion coating composition comprising:

A) dissolved and/or dispersed bismuth;

B) a complex fluoroacid, preferably fluosilicic acid, present in an amount sufficient to solubilize or disperse A);

C) dissolved copper ions; and at least one pH adjuster, in the form of an acid, base or a buffering acid/base combination present in a quantity sufficient to provide the composition with a pH in a range of from about 2.0-6.0.

Any combination or sub-combination of the foregoing aspects, unless specifically disclaimed is considered to fall within the scope of the invention.

For a variety of reasons, it is preferred that aqueous bismuth conversion coating compositions according to the invention, and, as defined above, may be substantially free from many ingredients used in compositions for similar purposes in the prior art. Specifically, it is increasingly preferred in the order given, independently for each preferably minimized ingredient listed below, that aqueous compositions according to the invention, when directly contacted with metal in a process according to this invention, contain no more than 1.0, 0.5, 0.35, 0.10, 0.08, 0.04, 0.02, 0.01, 0.001, or 0.0002 percent, more preferably said numerical values in grams per liter, most preferably the numerical values in ppm, of each of the following constituents: zinc, nickel, cobalt, manganese, chromium, cyanide, nitrite ions, organic surfactants, formaldehyde, formamide, urea, hydroxylamines, ammonia, tertiary amines, cyclic amines, e.g. hexamethylene tetraamine; silicates, siloxanes, organosiloxanes, silanes; lanthanide series metals, rare earth metals; phosphorus-containing acids and/or salts thereof; sulfur, e.g. sulfate, sulfonic acid; permanganate; perchlorate; boron, e.g. borax, borate; strontium; and/or free chloride.

Also it is increasingly preferred in the order given, independently for each preferably minimized ingredient listed below, that as-deposited bismuth conversion coatings and as-deposited post-treatments according to the invention, contain no more than 1.0, 0.5, 0.35, 0.10, 0.08, 0.04, 0.02, 0.01, 0.001, or 0.0002 percent, more preferably said numerical values in parts per thousand (ppt), of each of the following constituents: chromium, cyanide, nitrite ions, organic surfactants, formaldehyde, formamide, urea, hydroxylamines, ammonia and hexamethylene tetraamine; silicates, siloxanes, organosiloxanes, silanes; rare earth metals; phosphorus-containing acids and/or salts thereof; sulfur, e.g. sulfate, sulfonic acid; permanganate; perchlorate; boron, e.g. borax, borate; strontium; and/or chloride.

Some materials may be present in the bismuth conversion coating working bath resulting from, for example, drag-in from prior process steps, elution from substrates, inclusion as a counterion or contaminant. Non-limiting examples of materials not intentionally added to the bath which may be present, and are desirably minimized, include phosphate and silicate from cleaner drag-in; free Cl ions may be present from water contamination and Fe, Zn and Al ions eluted from substrates. Counterions which may be present include ammonia or ammonium ion, alkali metal (NH4+, Na+, K+), sulfates and the like.

The term "paint" includes all like materials that may be designated by more specialized terms such as lacquer, enamel, varnish, shellac, topcoat, and the like; and, unless otherwise explicitly stated or necessarily implied by the context. The simple term "metal" or "metallic' will be understood by those of skill in the art to mean a material, whether it be an article or a surface, that is made up of atoms of metal elements, e.g. iron, zinc, etc.; the total of metal elements present in amounts of at least, with increasing preference in the order given, 55, 65, 75, 85 or 90 atomic percent, the simple term "ferrous" includes pure iron and those of its alloys, such as steel, and likewise "zinciferous" and "aluminiferous" include the pure metals as well as their respective alloys.

Other than in the operating examples, or where otherwise indicated, all numbers expressing quantities of ingredients, reaction conditions, or defining ingredient parameters used herein are to be understood as modified in all instances by the term "about". Throughout the description, unless expressly stated to the contrary: percent, "parts of", and ratio values are by weight or mass; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) between one or more newly added constituents and one or more constituents already present in the composition when the other constituents are added; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise, such counterions may be freely selected, except for avoiding counterions that act adversely to an object of the invention; molecular weight (MW) is weight average molecular weight; the word "mole" means "gram mole", and the word itself and all of its grammatical variations may be used for any chemical species defined by all of the types and numbers of atoms present in it, irrespective of whether the species is ionic, neutral, unstable, hypothetical or in fact a stable neutral substance with well-defined molecules; and the terms "storage-stable" is to be understood as including solutions and dispersions that show no visually detectable tendency toward phase separation over a period of observation of at least 100, or preferably at least 1000, hours during which the material is mechanically undisturbed and the temperature of the material is maintained at ambient room temperatures (18 to 25° C.).

Organic material will be understood to describe molecules that are made up of at least one carbon atom with hydrogen (s) bonded thereto, the carbons may form chains or cyclic structures and may optionally include additional atoms and functional groups (e.g. oxygen, silicon, phosphorus and nitrogen) attached.

These and other features and advantages of this invention will become more apparent to those skilled in the art from the detailed description of a preferred embodiment.

DETAILED DESCRIPTION OF CERTAIN EMBODIMENTS OF THE INVENTION

The invention provides bismuth conversion coating compositions useful in coating metal substrate surfaces. The aqueous acidic bismuth conversion coating compositions comprising, or in some cases, consisting essentially of, or in some cases, consisting of, a mixture of:

A) dissolved and/or dispersed bismuth, desirably comprising Bi (III) ions, and optionally dissolved and/or dispersed bismuth compounds;

B) at least one water-soluble organic chelating agent, desirably comprising one or more water soluble organic acids capable of chelating the dissolved and/or dispersed bismuth preferably increasing solubility thereof; and may have a pH in a range of about 2.0 to about 6.

C) copper (II) ions;

D) at least one metal etchant, desirably comprising a source of free fluoride, for example a fluoride containing compound, such as HF and/or a complex fluoroacid which may provide a reservoir of free fluoride ion. Free and complex fluoride ion acts to increase etch of the metal substrate surface;

E) at least one pH adjuster, in the form of an acid, base or a buffering acid/base combination, useful to adjust the pH to in a range of 2-6, 2.5-5, 2.75-4.5, 3-4;

optional components of the bismuth conversion coating compositions comprise:

F) nitrate ions; and

G) Group IVB metals: Zr, Ti, Hf;

H) at least one accelerator; and

I) at least one water soluble and/or water dispersible polymeric compound.

The aqueous mixture may be in the form of a solution or a dispersion, preferably a storage-stable solution or dispersion; as used herein, the term "dispersion" includes mixtures in which none of the components of the mixture are dissolved in an aqueous medium as well as mixtures in which portions of one or more of the components of the mixture are dissolved in an aqueous medium.

Component A) dissolved and/or dispersed bismuth, desirably comprises dissolved Bi(III), but can be sourced from dissolved bismuth metal, dissolved and/or dispersed bismuth compounds or may be sourced from Bi(V) desirably with a reducing agent useful to the lower the oxidation state of the bismuth to Bi(III). Some sources of bismuth may be relatively insoluble in water and can be useful in the invention by first dissolving in acid or by adjusting the pH of the conversion coating composition. Illustrative, non-limiting examples of bismuth sources comprise bismuth compounds such as bismuth nitrate, $Bi(NO_3)_3$; bismuth nitrate pentahydrate $Bi(NO_3)_3.5H_2O$; bismuth subnitrate, $Bi_5O(OH)_9$ $(NO_3)_4$; bismuth oxide, $Bi_2O_3$; bismuth hydroxide, $Bi(OH)_3$; bismuth aluminate, $Bi_2(Al_2O_4)_3$; bismuth ammonium citrate, $C_{12}H_{22}BiN_3O_{14}$; bismuth citrate, $BiC_6H_5O_7$ (1:1); bismuth subcitrate, $C_{12}H_8BiK_5O_{14}$; bismuth sodium tartrate, $(C_4H_4O_6)_2BiNa$; bismuth sodium triglycollamate, $C_{24}H_{28}BiN_4Na_7O_{25}$, a nitrilotriacetic acid bismuth complex sodium salt; bismuth subacetate, $CH_3COOBiO$; bismuth subcarbonate (basic bismuth carbonate), $(BiO)_2CO_3$; bismuth carbonate, $Bi_2(CO_3)_3$; bismuth fluoride, $BiF_3$; bismuth molybdate, $Bi_2(MoO_4)_3$; bismuth subsalicylate, $HOC_6H_4COOBiO$ (1:1 or 3:1); bismuth sulfate, $Bi_2(SO_4)_3$; bismuth silicates, $Bi_4Si_3O_{12}$, complex silicates; bismuth hydroxide, $Bi(OH)_3$; bismuth tungstate, $Bi_2(WO_4)_3$; bismuth vanadate, $BiVO_4$. Illustrative, non-limiting examples of preferred bismuth sources comprise Bi compound(s) bismuth oxide, bismuth sulfate, bismuth nitrate, bismuth sub-nitrate, and similarly at least partially water soluble and/or acid soluble bismuth materials.

Other sources of Bi may be used but tend to be undesirable due to their counter ions, environmental impact, and/or safety reasons, for example: bismuth (V) phosphate, $Bi_3$ $(PO_4)_5$; bismuth (III) orthophosphate, $BiPO_4$; bismuth halogens, such as bismuth bromide, $BiBr_3$, $BiOBr$; bismuth oxybromide, $BiOBr$; bismuth pentafluoride, $BiF_5$; bismuth trihydride, $BiH_3$; bismuth chloride, $BiCl_3$; bismuth oxychloride, $BiOCl$; bismuth iodide, $BiI_3$; bismuth oxyiodide, $BiOI$; likewise insoluble sodium bismuthate, $NaBiO_3$; bismuth oxalate, $Bi(C_2O_4)_3$; bismuth oleate, $[CH_3(CH_2)_7CH=CH$ $(CH_2)_7COO]_3Bi$; as well as gas evolvers, such as bismuth butylthiolaurate, $CH_{39}(CH_2)_9CH(SC_4H_9)COOBi(OH)_2$ and bismuth sulphide, $Bi_2S_3$, which can liberate $H_2S$ gas when dissolved in acids.

Any inorganic or organic source of Bi(III) in the working bath may be used which provides Bi (III) depositable as a conversion coating on metal substrates, as disclosed herein, and does not negatively affect objects and benefits of the invention. Combinations of two or more different bismuth compound(s) may be used.

The bismuth conversion coating compositions useful in the invention may have a concentration of Component A) dissolved and/or dispersed bismuth of, for example, about 5 to 10,000 ppm, 15 to 5000 ppm, 25 to 4000 ppm, 50 to 3000 ppm, 75 to 2000 ppm, 90 to 1500 ppm, 100 to 1000 ppm, 200 to 750 ppm or 250 to 600 ppm. According to advantageous embodiments of the invention, the bismuth compound(s) preferred as sources of bismuth (III) are soluble in water. For example, the bismuth compound(s) may have a solubility in water at 25° C. of at least 0.5%, at least 1%, at least 5% or at least 10% by weight. However, in other embodiments, the bismuth compound(s) may be dispersible in water, preferably providing storage-stable dispersions, which provide bismuth (III) ions in the bismuth conversion coating compositions and/or baths in conjunction with Component B).

Component B) at least one water-soluble organic chelating agent preferably comprises one or more water soluble organic acids and/or salts thereof capable of chelating the dissolved and/or dispersed bismuth, preferably substituted and/or unsubstituted organic carboxylic acids. In one embodiment component B) comprises water soluble C3-C12, preferably C4-C9 organic acids and/or salts thereof. (Meth)acrylic monomer acids and salts thereof are preferably avoided due to their tendency to polymerize in the bath. The organic acids may be aliphatic or aromatic; linear, branched or cyclic; saturated or unsaturated and may include one or more nitrogen-containing functional groups. The water soluble organic acids may be mono carboxylic acids, but desirably may be di, tri, tetra carboxylic acids (organic polycarboxylic acids) or have even greater numbers of carboxyl groups provided they do not interfere with the objects of the invention. Having a plurality of carboxyl groups provides a plurality of donor atoms available to bind a metal atom. In a preferred embodiment, the organic polycarboxylic acid are at least bidentate, meaning they have two donor atoms which allow them to bind to a central bismuth atom or ion at two points. Compared to two separate donors, e.g. mono carboxylic acids such as formic acid, bidentate donation is entropically favored. The water soluble organic acids and/or salts thereof may be substituted with other functional groups such as hydroxyl groups. In one embodiment, the organic carboxylic acids may be hydroxyl-functionalized polycarboxylic acids. In a further embodiment, the hydroxyl-functionalized polycarboxylic acids desirably may have a ratio of OH groups to COOH groups ranging from about 0.5:1 to 5:1. Desirably, Component B) is present in an amount sufficient to solubilize or suspend Bi ions, for example about 50 to 100,000 ppm, 100 to 75,000 ppm, 200 to 50,000 ppm, 250 to 25,000 ppm, 300 to 20,000 ppm, 350 to 10,000 ppm, 400 to 7,5000 ppm, 450 to 5000 ppm or 500 to 3000 ppm.

Non-limiting examples of suitable materials for Component B) may include: Organic acids with multiple carboxylic acid functionalities such as, alpha-omega-dicarboxylic acids, for example propanedioic acid, butanedioic acid, pentanedioic acid, hexanedioic acid, heptanedioic acid, octanedioic acid, nonanedioic acid, decanedioic acid and the like, which may further comprise one or more additional functional groups along the carbon chain, for example hydroxyl functional groups. Particular examples of suitable materials for Component B) include tartaric acid, citric acid, ethylenediaminetetraacetic acid, and the like, as well as mono-carboxylic acids such as lactic acid, gluconic acid, gallic acid, ascorbic acid, bicine (2-(Bis(2-hydroxyethyl) amino)acetic acid) and, the salts of any of these acids, and mixtures of one or more of the organic acids and salts.

Component C) copper ions, preferably copper (II) ions, which may be present in the bismuth conversion coating compositions in amounts of about 1 to 300 ppm, 1.5 to 200 ppm, 2 to 150 ppm, 3 to 100 ppm, 3.5 to 75 ppm, 4 to 50 ppm, 4.5 to 25 ppm or 5 to 20 ppm. Non-limiting examples of suitable materials for Component C) may include water soluble and/or acid soluble, inorganic and organic sources of copper, such as hexafluorosilicate, hydroxide, nitrate, chloride, phosphate and sulphate salts as well as acetate, citrate, formate, gluconate, tartrate, and other organic salts of copper, as well as oxides, selenite, selenite and the like. Any inorganic or organic source of Cu(II) may be used which provides Cu(II) ions dissolved in the conversion coating composition, at least partially depositable in a conversion coating on metal substrates, as disclosed herein, and does not negatively affect objects and benefits of the invention. Copper (II) sulfate, copper (II) nitrate, copper (II) oxide, copper (II) hydroxide are preferred. Combinations of two or more different copper compound(s) may be used.

Component D) one or more metal etchants may comprise a source of free fluoride, such as HF and/or a complex fluoroacid, may be present as a source of fluoride ion, preferably a complex fluoroacid or salt thereof. The complex fluoroacid may be selected from fluoroacids of the general formula $H_2XF_6$, where X may be Ti, Zr, Hf and Si; salts of these fluoroacids may also be useful in the invention. Generally, amounts of Component D) such as HF, a complex fluoroacid and/or salt thereof useful in the bismuth conversion coating compositions range from about 0 to 5000 ppm, 100 to 4500 ppm, 200 to 4000 ppm, 300 to 3500 ppm, or 400 to 3000 ppm 450 to 2500 ppm, 500 to 2000 ppm, 525 to 1500 ppm. Component D) desirably may provide a reservoir of free fluoride ion. Generally, amounts of Free Fluoride useful in the bismuth conversion coating compositions range from about 0 to 5000 ppm, 1 to 4000 ppm, 3 to 3000 ppm, 4 to 2000 ppm, 5 to 1000 ppm, 6 to 500 ppm, 8 to 200 ppm or 10 to 100 ppm. Free and complex fluoride ion acts to increase etch of the metal substrate surface.

Component E) the pH adjuster, may be in the form of an acid, base or a buffering acid/base combination. In the bismuth conversion coating composition, preferably, a pH is within a range from 2 to 6. When the pH is less than 2, etching becomes excessive; therefore, adequate coat formation becomes impossible. When it exceeds 6, etching becomes insufficient; therefore, a good coat cannot be attained, and precipitation of bath components may occur. More preferably, the above lower limit is 2.5 and the above upper limit is 5.5. Still more preferably, the above lower limit is 3 and the above upper limit is 4. In order to control the pH of the chemical conversion coating agent, there can be used acidic compounds such as nitric acid and sulfuric acid, and basic compounds such as sodium hydroxide, potassium hydroxide and ammonia. Methods for adjusting pH levels to in a range of 2-6, 2.5-5, 2.75-4.5, 3-4 are known to the skilled person. The desired pH is preferably set by addition of at least one base, more preferably at least one inorganic and/or at least one organic base. Suitable examples of pH adjusters useful in the bismuth conversion coating compositions as described herein include, NaOH, KOH, ammonium hydroxide, ammonium bicarbonate, ammonium carbonate, sodium bicarbonate, sodium carbonate, potassium bicarbonate, potassium carbonate, and $Bi(OH)_3$.

Component F) nitrate ions; are desirably present and may be provided as the counterion or partial counterion to other components of the bismuth conversion coating composition, such as by way of non-limiting example, Components A), as well as D) and F), if present. Accordingly, suitable sources of Component F) may include, nitric acid, bismuth(III) nitrate pentahydrate; bismuth subnitrate, as well as copper nitrate and nitrates of Group IVB metals, if the counter cation is present, sodium nitrate and nitric acid are preferred. Nitrate ions are desirably present in amounts of about 0 to 10,000 ppm, 15 to 9000 ppm, 30 to 8000 ppm, 45 to 7000 ppm, 60 to 6000 ppm, 75 to 5000 ppm, 90 to 4000 ppm, 100 to 3500 ppm or 75 to 3000 ppm. Any inorganic or organic source of nitrate ions may be used which does not negatively affect objects and benefits of the invention. Combinations of two or more different nitrate salts may be used.

Additional components of the bismuth conversion coating compositions may comprise:

Component G) Group IVB metals may be present in the bismuth conversion coating composition and in the resulting coating. Desirably the Group IVB metals may be selected from: Zr, Ti, and Hf and combinations thereof, preferably Zr and Ti. Generally, amounts of Component G) useful in the bismuth conversion coating compositions range from about 0 to 500 ppm, 10 to 450 ppm, 20 to 400 ppm, 30 to 350 ppm, 40 to 300 ppm, 45 to 250 ppm, 50 to 200 ppm, 70 to 150 ppm. Non-limiting examples of suitable materials for Component G) may include water soluble and/or acid soluble, inorganic and organic sources of Group IVB metals, such as: fluorotitanic acid, $H_2TiF_6$; fluorozirconic acid, $H_2ZrF_6$; zirconium basic carbonate, $Zr(OH)_2CO_3.ZrO_2$; titanium nitrate, $Ti(NO_3)_4$; titanium acetate, $Ti(CH_3COO)_2$; zirconium nitrate, $Zr(NO_3)_4$; zirconium acetate, $Zr(CH_3COO)_2$. The Group IVB metals fluoro acids may optionally also provide at least a part of Component D) one or more metal etchants.

Component H) one or more accelerators may be present in the bismuth conversion coating composition. The conversion coating composition typically does not require the presence of an accelerator due to relatively quick deposition, as shown by the examples which contain no accelerator. If desired, one or more coating accelerators in amounts of 1 to 5000 ppm may be included, preferably oxidizing accelerators, such as peroxides, iron (III) ions, nitrite ions, hydroxylamine, persulfate ions, sulfite ions, hyposulfite ions, and halogen-based ions such as sodium chlorate. Non-limiting examples of suitable materials for Component H) may include water soluble and/or acid soluble accelerators such as hydroxylamine (which may be provided as a salt of such as hydroxylamine sulfate); peroxides, preferably hydrogen peroxide; sodium nitrobenzene sulfonate; sodium nitrite, nitroguanidine, oximes, and the like which are capable of accelerating the deposition reaction of the bismuth conversion coating composition without deleterious effects on the working bath or the deposited coating. The amount of Component H) varies with the type of accelerators used and selecting suitable amounts is within the knowledge of one of ordinary skill in the conversion coating arts. Generally, amounts of Component H) useful in the bismuth conversion coating compositions can range from about 0 to 500 ppm, 10 to 450 ppm, 20 to 400 ppm, 30 to 350 ppm, 40 to 300 ppm, 45 to 250 ppm, 50 to 200 ppm, 70 to 150 ppm, alternatively for less active accelerators or those whose concentrations reduce quickly due to for example decomposition, the upper limit accelerator amount may include concentrations of 1000 ppm, 900, 800, 700, or 600 ppm in addition to the previously disclosed ranges.

Although the bismuth conversion coating composition deposits satisfactory bismuth coatings in the absence of polymer, Component I) one or more water soluble and/or water dispersible polymeric components may advantageously be included in the bismuth conversion coating composition, if desired. Generally, amounts of Component I) useful in the bismuth conversion coating compositions range from about 0 to 500 ppm, 10 to 450 ppm, 20 to 400 ppm, 30 to 350 ppm, 40 to 300 ppm, 45 to 250 ppm, 50 to 200 ppm, 70 to 150 ppm. Non-limiting examples of suitable materials for Component I) include: (i.1) polyhydroxyl alkylamino derivatives of poly{p-hydroxystyrene} as described in more detail, in U.S. Pat. No. 4,963,596, the entire disclosure of which, except to the extent contrary to any explicit statement herein, is hereby incorporated herein by reference; (i.2) epoxy polymers, particularly polymers of the diglycidylether of bisphenol-A, optionally capped on the ends with non-polymerizable groups and/or having some of the epoxy groups hydrolyzed to hydroxyl groups; (i.3) polymers and copolymers of acrylic and methacrylic acids and their salts; (i.4) organic polymeric components selected from phenalkamine compounds, polyamidoamine compounds, catechol compounds and catechol copolymers; and (i.5) polymers and copolymers comprising silicon, which may be organic and/or inorganic polymers.

As used herein, the term "phenalkamine compound" means a molecule comprising a benzene ring having at least three functional groups attached to the benzene ring: a) an OH (i.e. hydroxyl) group; b) a C6-C30 saturated or unsaturated alkyl group; and c) an amine-functionalized substituent, such as an amino-alkyl substituent. In accordance with one embodiment of the invention, the phenalkamine compound may correspond to Formula (I):

$$R\text{—}Ar(\text{—}OH)\text{—}CHR'NHCH_2CH_2(NHCH_2CH_2)_nNH_2 \quad \text{(I)}$$

wherein Ar is a benzene ring, R is a C6-C30 linear or branched, saturated or unsaturated alkyl group, R' is H or an alkyl group (e.g., C1-C6 or C1-C3 alkyl, such as methyl, ethyl, propyl, etc.), and n is 0 or an integer of at least 1, 2, 3, 4, 5 and not more than 20, 18, 16, 14, 12, 10, 8, or 6, preferably 1-4.

According to one embodiment, a) and c) are ortho to each other; i.e., they are attached to adjacent carbon atoms of the benzene ring. According to a further embodiment, b) is attached to a carbon atom of the benzene ring that is separated by at least one carbon atom of the benzene ring from each of the carbon atoms to which a) and c) are attached. In another embodiment, c) is ortho to the hydroxy group and b) is meta to a). The benzene ring may bear one or more additional non-hydrogen substituents other than those recited in Formula (I), for example, alkyl groups (e.g., methyl, ethyl), and a hydroxyl group (in addition to a). For example, a second optional hydroxyl group may be present on the benzene ring in a position meta to c). In one embodiment, the phenalkamine compound(s) may be free of hydroxyl groups that are ortho to a). The amine-functionalized substituent c) may comprise one or more amino groups, preferably primary and/or secondary amino groups, substituted on an alkylene group wherein the alkylene group is attached to the benzene ring. In one embodiment, c) may comprise at least one primary amino group or optionally two or more primary and/or secondary amino groups. Mixtures or combinations of phenalkamine compounds may also be utilized. Desirably, the phenalkamine polymer has a weight average molecular weight ranging from 200 to 2000 daltons. Phenalkamines are further described in co-pending International Application No. PCT/2019/065127, incorporated herein by reference in its entirety.

As used herein, the term "polyamidoamine compounds" means a linear or branched, saturated or unsaturated organic polymer comprising a plurality of amide functional groups and optionally amine and/or imidazoline functional groups. The polymer may comprise tertiary nitrogen atoms, multiple branches and/or, at least some imidazoline functional groups having amide linkages on their substituents. Desirably, the polyamidopolyamine polymer has a weight average molecular weight ranging from 200 to 10,000. Polyamidoamines are further described in more detail, in International Patent Publication WO2016167928, incorporated herein by reference in its entirety.

The term "catechol compound" means an organic compound with an aromatic ring system that includes at least two hydroxyl groups positioned on adjacent carbon atoms of the aromatic ring system. As used herein, the term "catechol compounds" comprises catechols, and catechol derivatives such as catecholamines, e.g. dopamine and 3,4-dihydroxy-L-phenylalanine. "Catechol copolymers" means reaction products of at least one catechol/catechol derivative with at least one co-reactant compound having one or more functional groups reactive therewith (where the co-reactant compound may be, for example, an amine, particularly a polyamine such as a polyethyleneimine, or a (meth)acryl-functionalized compound such as methacrylamidoethyl ethylene urea), and salts and mixtures thereof. Desirably, the catechol copolymer has a weight average molecular weight ranging from 200 to 10,000 daltons. Catechols, catechol derivatives and polymeric reaction products are further described in more detail, in International Patent Publication WO2018119368, incorporated herein by reference in its entirety.

Other additives known in the metal pretreatment arts may be included in the bismuth conversion coating compositions disclosed herein provided that the additive does not interfere with deposition and performance of bismuth conversion coatings. Additives may include, surfactants, oxidizing agents (different from accelerators), thickening agents, rheology modifiers, dispersants, biocides, biostats, adhesion promoters and the like.

Some materials, such as metal elements may be present in the conversion coating composition as additives or as contaminants, such as metals of Group IIB, VB-VIIB, Group VIII, Group IIIA & IVA, as well as Sb. These metal elements may be used as additives provided that the additive does not interfere with deposition and performance of bismuth conversion coatings. In some embodiments, such metals are not intentionally added to the bismuth conversion coating compositions disclosed herein, and are preferably omitted, yet may be present as inevitable contaminants.

Brighteners, such as plating brighteners, e.g. naphthalenedisulfonic acid, diphenyl sulfonates, aryl sulfonamides, azo dyes and the like, though not preferred, may be included as an optional ingredient in the bismuth conversion coating compositions disclosed herein provided that the brightener does not interfere with deposition and performance of bismuth conversion coatings. In a preferred embodiment of the bismuth conversion coating compositions disclosed herein brighteners are absent, generally omitted as adding cost to the products.

Methods of Making

The bismuth conversion coating compositions of the present invention may be prepared using any suitable technique known in the art. In one embodiment, the bismuth conversion coating compositions may be prepared by combining B) at least one water-soluble organic chelating agent with water, preferably distilled water, followed by adding a source of A) dissolved and/or dispersed bismuth with stirring to form a mixture. Thereafter, adjusting the pH of the mixture to a selected bath operating pH value.

In a preferred embodiment, B) may comprise one or more water soluble organic acids and the pH may preferably be adjusted to a pH ranging from about 2-6 by addition of an alkaline material, for example a dilute solution of ammonium bicarbonate. Other alkaline sources, e.g. sodium hydroxide, may be used to increase pH provided that they do not interfere with deposition and performance of the conversion coating.

After adjusting the pH to operating conditions, the conversion coating composition desirably contains Bi(III) ions and may contain a colloidal dispersion of bismuth particles. The bismuth conversion coating compositions may include anions of the dissociated water-soluble organic chelating agent based on the operating pH.

As used herein, the term "storage-stable" when referring to a mixture (whether a solution or a dispersion) means that the mixture after being stored in a sealed container over a period of observation of at least 3 months at 20° C., during which the mixture is mechanically undisturbed, exhibits no phase separation and no precipitation or settling out of any material that is visible to the unaided human eye.

According to aspects of the invention, an aqueous mixture of at least one bismuth conversion coating composition is brought into contact with a bare metal substrate surface. Such an aqueous mixture (which may be in the form of a solution or a dispersion and preferably is a storage-stable mixture) may be formed by any suitable method. For example, an aqueous mixture may be used directly or after dilution of the aqueous mixture to a particular desired end-use concentration. Water alone may be used for such dilution, but in other embodiments of the invention it is contemplated that one or more other types of components may be included in the aqueous mixture. For example, an acid, base or buffer may be combined into the aqueous solution to modify its pH characteristics. In certain embodiments of the invention, the pH of the aqueous mixture, when contacted with a bare metal substrate surface (i.e., when used in a working conversion coating bath) may be from 2-6, 2.5-5, 2.75-4.5, 3-4 for example.

An aqueous mixture (working bath) repeatedly contacted with bare metal substrate surfaces can, over time, become depleted with respect to the concentration of bismuth compound(s) and other components, such as copper. Should this happen, the aqueous mixture in the working bath may be replenished by addition of individual components or a replenisher containing a combination of the components whose amounts require adjustment to provide an amount bismuth compound(s) etc. effective to restore the desired concentration. Compositions according to the invention may be provided in a two-pack, in which Part A may comprise for example bismuth, copper and other components that do not generate precipitates with Bi and/or Cu, e.g. nitric acid and/or chelating agent(s), and Part B may comprise chelating agent(s), fluoride containing compounds and other components. In one embodiment, a replenisher for the bismuth conversion coating bath comprises bismuth, copper and nitric acid, optionally in the form of a readily dispersible slurry. Further, it is understood that a repeatedly used working bath containing the aqueous mixture may accumulate some amount of various components carried over from a cleaning stage, such as alkaline builders (sodium hydroxide, potassium hydroxide, alkali metal carbonates, alkali metal bicarbonates, phosphates, silicates), surfactants and oil/grease/dirt contaminants. When the levels of such components reach a point where the performance of the working bath or the quality of the conversion coated metal substrates being processed becomes adversely affected, the contents of the working bath may be discarded and replaced or treated to remove or reduce such components or otherwise counteract their effect (by pH adjustment and/or ion exchange, for example).

Metal Substrates

The present invention is particularly useful in connection with the treatment of metal substrate surfaces that are susceptible to corrosion, especially bare metal surfaces that are to be painted. Ferrous (iron-containing) metal substrates may be treated in accordance with the present invention, for example. Exemplary metal substrates include, without limitation, iron; steel substrates such as cold rolled steel, hot rolled steel, and stainless steel; steel coated with zinc metal, zinc alloys such as electrogalvanized steel, galvalume, galvanneal, and hot-dipped galvanized steel; magnesium alloys; aluminum alloys and aluminum plated steel substrates. A component or article containing more than one type of metal substrate can be processed in accordance with the procedures set forth herein. The present invention may also be practiced using metal substrates in which an iron-containing component or layer is covered with a metal coating that does not contain iron (e.g., a zinc coating), wherein the iron-containing component or layer becomes exposed as a result of cutting, forming, fitting, sanding, grinding, polishing, scoring or other such operations.

Cleaning Step

As used herein, the term "bare metal substrate surface" refers to a metallic surface of a metal substrate which is essentially free of any contaminants and which is not conversion coated or coated with some other substance, other than native oxides which may be present through reaction for the metal elements with oxygen in the atmosphere. According to certain aspects of the invention, the bare metal substrate surface to be pre-treated with a bismuth conversion coating composition is obtained by cleaning a contaminated metal substrate surface to remove grease, oil, dirt or other extraneous materials and contaminants using any of the cleaning procedures and materials known or conventionally used in the art, including for example mild or strong alkaline cleaners, neutral cleaners and acidic cleaners. Methods of cleaning metal surfaces are described, for example, in Murphy, "Metal Surface Treatments, Cleaning", Kirk-Othmer Encyclopedia of Chemical Technology, 2000. Aqueous as well as non-aqueous (i.e., organic solvent-based) cleaners may be employed. Components of suitable cleaners may include, for example, inorganic bases (alkali metal hydroxides, alkali metal carbonates, alkali metal bicarbonates, for example), builders (e.g., phosphates, silicates), surfactants, water, organic solvents and the like. Examples of alkaline cleaners include Parco® cleaner ZX-1, Parco® cleaner 315, and BONDERITE®® C-AK T51, each of which is available from Henkel Corporation, Madison Heights, Mich. The cleaner may be applied to and contacted with the metal substrate surface using any suitable method, such as spraying, immersion, wiping and so forth. The cleaner temperature during contacting may be, for example, from about 20° C. to 60° C.), but may be lower or higher temperature that do not negatively affect the process. The duration of the contacting between the cleaner and the metal substrate may be any time effective to achieve the desired extent of contaminant removal (for example, from 10 seconds to 5 minutes). Mechanical action may be utilized to assist in contaminant removal. While typically the cleaners used for such purpose are in liquid or solution form, it is also possible to clean metal substrate surfaces using mechanical means alone, such as sanding, sand blasting or blasting with other dry media. The metal substrate, following a cleaning step, may optionally be subjected to one or more further steps prior to being contacted with a solution or dispersion comprising one or more preformed catechol compound/co-reactant compound reaction products. For example, the metal substrate surface may be rinsed one or more times with water and/or an aqueous acidic solution, after cleaning.

A bare metal substrate surface may also be prepared by methods of forming or finishing metal articles which result in bare metal surfaces being generated, such as cutting, scoring, filing, grinding, abrasion, shot-blasting, sanding and the like.

Conversion Coating Step

Subsequent to any cleaning step, the metal substrate surface is subjected to a conversion coating step by contacting with a bismuth conversion coating composition of the invention. The conversion coating step may be carried out immediately after the cleaning step or after an optional deoxidizing and/or further rinsing step as described above, or after an extended period of time following the cleaning step.

An aqueous mixture comprised of bismuth compound(s) is contacted with a cleaned surface of a metal substrate, in accordance with the present invention. Such contacting may be accomplished by any suitable method, such as, for example, spraying, immersion, dipping, brushing, roll-coating or the like. Typically, the aqueous mixture during such contacting is maintained at a temperature of from ambient temperature (e.g., room temperature) to a temperature moderately above ambient temperature. For instance, the temperature of the aqueous mixture in a working bath may be from 10 to 54° C., from 16 to 49° C., from 25-36° C. or from 32 to 43° C.

The contact time should be selected to be a time sufficient to deposit an effective amount of bismuth conversion coating on the bare metal substrate surface, which may generally be regarded as an amount effective to reduce the amount of corrosion on the surface of the metal substrate as measured according to ASTM B117-19, as compared to a bare metal substrate surface control measured under the same conditions. Typically, contact times of from 0.1 to 30 minutes (e.g., 8 seconds to 30 minutes, or 10 seconds to 20 minutes, or 30 seconds to 10 minutes, 1 minute to 6 minutes, 1.5 minutes to 3 minutes, or any of the ranges encompassed by the disclosed ranges) may be selected as suitable.

Once the desired contact time with the bismuth conversion coating composition has been reached, contacting is halted, and the conversion coated metal substrate may be taken on to further processing steps. For example, spraying may be stopped or the article comprising the conversion coated metal substrate may be removed from an immersion bath. Residual or surplus aqueous mixture may be permitted to drain from the surface of the metal substrate. Removal of residual or surplus aqueous solution can be accomplished by any suitable method or combination of methods, such as drip-drying, squeegeeing, wiping, draining or rinsing with water. According to certain embodiments, the conversion coated metal substrate surface may be dried (e.g., air-dried, heat or oven dried). In other embodiments, the conversion coated metal substrate is not dried before proceeding with further processing steps such as sealing, painting or the like, by way of non-limiting example electrophoretic coating with paint.

It has been demonstrated that a conversion coating of bismuth and metal oxides of the substrate metal can be deposited on a metal substrate which provide corrosion resistance of the final painted part equal to that of tri-cationic zinc phosphate.

In one embodiment, a bismuth conversion coating composition may be applied to a surface of a reactive metal substrate by contacting the metal substrate with the bismuth conversion coating composition for approximately 2 minutes at a temperature of 24-40° C. Contacting may be accomplished by any suitable means including but not limited to dipping, spraying, roll-coating and the like. Contact times and temperatures may be varied, but are typically less than 10, preferably less than 5 minutes. Desirably contact time is at least about 1, 3, 5, 10, 15, 20, 30, 40, 50 or 60 seconds and is no more than about 9, 8, 7, 6, 5, 4, 3 or 2 minutes. Desirably temperature ranges from at least about 21, 22, 23, 24, 25, 26, 27, 28, 29, 30, 31 or 32° C. and no more than about 40, 39, 38, 37, 36, 35, 34 or 33° C. Higher or lower temperatures, for example at least greater than the freezing point of the bath and up to 50° C., may be employed provided that they do not interfere with deposition of the conversion coating or negatively affect the metal bismuth conversion coating working bath or performance of the conversion coating.

Without being bound by a single theory, contacting the metal substrate with aqueous acidic bismuth conversion coating compositions results in several reactions: oxidation of the substrate ($M^{0} \rightarrow M^{n+} + n^{e}$, M=Fe, Zn, Al), localized pH increase due to the reduction of $H^{+}$ results in $Bi^{3+}$ deposits on the metal surface of the substrate as a mixture of bismuth oxides and/or hydroxides with the substrate elements (Fe, Zn, Al).

Post-Treatment

The present invention may also be part of a multi-step process wherein the bismuth conversion coating as-deposited is subjected to a post-treatment and/or sealing rinse prior to painting.

Non-limiting examples of suitable post-treatments include contacting the as-deposited bismuth conversion coating with an acidic aqueous post-treatment composition comprised of one or more Periodic Table Group IV metals such as Zr, Ti and Hf, typically containing other components as well (such as a metal etchant (e.g., fluoride), optionally also copper and/or nitrate and/or zinc and/or Si-based substances). Such acidic aqueous post-treatment compositions are sometimes referred to as Group IV metal oxide-depositing compositions (e.g., zirconium oxide-depositing compositions). The acidic aqueous post-treatment composition may, for example, have a pH of 5.0 or less and comprise: 50 to 750 ppm of at least one Group IV metal; 0 to 50, 1 to 50 or 5 to 50 ppm of copper; 10 to 100 ppm of free fluoride; optionally, nitrate; and, optionally, Si-based substances such as silanes, $SiO_2$, silicates and the like. Optionally, the post-treatment may be a composite post-treatment further comprising dissolved and/or dispersed organic polymer. The acidic aqueous post-treatment composition may be applied to a surface of the metal substrate having the bismuth conversion coating deposited on at least a portion of the surface by contacting the metal substrate with the acidic aqueous post-treatment composition for a time sufficient to form a Group IV metal oxide on at least a portion of the metal substrate surfaces. Contacting may be accomplished by any suitable means including but not limited to dipping, spraying, roll-coating and the like. Contact times and temperatures may be varied, but are typically less than 10, preferably less than 5 minutes. Desirably contact time is at least about 1, 3, 5, 10, 15, 20, 30, 40, 50 or 60 seconds and is no more than about 9, 8, 7, 6, 5, 4, 3 or 2 minutes. Desirably temperature ranges from at least about 21, 22, 23, 24, 25, 26, 27, 28, 29, 30, 31 or 32° C. and no more than about 40, 39, 38, 37, 36, 35, 34 or 33° C. Higher or lower temperatures, for example at least greater than the freezing point of the bath and up to 50° C., may be employed provided that they do not interfere with deposition of the conversion coating or negatively affect the metal bismuth conversion coating working bath or performance of the conversion coating.

Suitable sealing rinses desirably may be aqueous rinses, but optionally may include organic solvents. The sealing rinses may contain organic polymers, inorganic polymers or a combination thereof. The sealing rinses typically comprise water soluble and/or water dispersible polymers that can coalesce, cross-link or otherwise form a seal layer on the conversion coated metal substrate upon drying, without or without heating. The sealing rinse typically may have a pH of about 4-10.

Sealing rinses are distinguished from "paint" for purposes of this invention by the following differences:

Organic Sealing rinses are generally approximately 0.05 and 2.0 microns in thickness (wet-film) whereas paint films are typically between 15-500 microns in thickness (wet-film).

Organic Sealing layers are typically 0.01 to 1.0 microns in dry-film thickness as determined by Glow Discharge Optical Emission Spectroscopy. Dry film thickness of a paint layer is at a minimum about 15 microns, and generally is about 1 mil (25.4 microns), 1.5 mils (38.1 microns) or more, with typical vehicle paint having a total paint thickness of about 3-5 mils (76.2 to 127 microns).

Organic Sealing rinses typically contain at most about 0.5 wt. % organic solids whereas paint compositions typically contain organic solids of at least about 5 wt. % up to about 60 wt. %.

Non-limiting examples of polymers suitable for use in sealing rinses include by way of non-limiting example, epoxy, phenolic, acrylic, polyurethane, polyester, and polyimide and combinations thereof. In one embodiment, organic polymers selected from epoxy, phenolic and polyimide are utilized. Preferred polymers forming additional layers include phenol-formaldehyde-based polymers and copolymers generated from, for example novolac resins, which have a formaldehyde to phenol molar ratio of less than one, and resole resins having a formaldehyde to phenol molar ratio of greater than one. Such polyphenol polymers can be made as is known in the art for example according to U.S. Pat. No. 5,891,952. Novolac resins are desirably used in combination with a crosslinking agent to facilitate curing. In one embodiment, a resole resin having a formaldehyde to phenol molar ratio of about 1.5 is utilized to form a polymer additional layer on the bismuth conversion coating. Phenolic resins useful in forming polymeric layers desirably have molecular weights of about 1000 to about 5000 g/mole, preferably 2000 to 4000 g/mole.

In some embodiments, the water soluble and/or water dispersible polymers may comprise functional groups reactive with elements in the bismuth conversion coating, which may form bonds between a polymer and the coating. For example, uncured novolac and resole resins comprise OH functional groups which may react with metals in the bismuth conversion coating thereby linking the polymer to coating.

Optionally, Si-based substances such as silanes, $SiO_2$, silicates and the like may be used as the sealant or may be used as additives. The sealing rinses may be applied to a surface of the metal substrate having the bismuth conversion coating deposited on at least a portion of the surface by contacting the metal substrate with the sealing rinses for a time sufficient to wet the surface of the bismuth conversion coating and/or form a layer of sealant on at least a portion of the metal substrate surfaces. Contacting may be accomplished by any suitable means which further enhances the corrosion resistance of the conversion coated metal substrate surface.

Application of Additional Coatings

Following conversion coating and optionally, one or more post-rinsing (or "sealing") steps, the metal substrate may be subjected to one or more further processing steps, including in particular the application of a paint or other decorative and/or protective coating. Any such coating known in the art may be employed, including for example, electrophoretic coatings (E-coatings), solvent-borne paints, aqueous-borne paints, powder coating and the like. In such applications, the bismuth conversion coating or sealer may function as a primer or anti-corrosion layer.

Accordingly, the present invention may be practiced in accordance with the following exemplary multi-step process:

1) cleaning of a metal substrate surface;
2) rinsing of the cleaned (bare) metal substrate surface with an aqueous mixture comprised of preformed catechol compound/functionalized co-reactant reaction product(s);
3) conversion coating of the cleaned and rinsed metal substrate surface;
4) optionally, rinsing of the conversion-coated metal substrate surface with water and/or a post-rinse solution or dispersion;
5) electrophoretic coating of the optionally rinsed conversion-coated metal substrate surface;
6) rinsing of the electrophoretic-coated metal substrate surface with water; and
7) baking of the rinsed electrophoretic-coated metal substrate.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of a composition, article or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

A conversion coating composition was prepared by combining the following with mixing:
DI water 99.72 wt. %
Bismuth subnitrate; $Bi_5O(OH)_9(NO_3)_4$ 0.08% (0.057 wt. % Bi)
Lactic Acid (88 wt. %) 0.20 wt. %
Mixture's pH=2.7. The mixture described above was added to DI water as follows, which raised the pH to 3.1: DI water 75%, Mixture 25%. The pH was increased using a 10% ammonium bicarbonate solution (BONDERITE® M-AD 700) until pH=3.5 was achieved. This resulted in a clear straw yellow colored solution containing 143 ppm Bi & 440 ppm lactic acid.

The solution was warmed to 32° C. ACT CRS panels were dipped into bismuth conversion coating composition (process outlined below). This resulted in a visibly black coating that contained the elements Bi, O, & Fe.

Panel Coating Process: Bare metal panels commercially available from ACT Laboratories, Inc. were used as samples for coating. Coating processes are as described below unless stated otherwise.

Bismuth Conversion Coating Process
Clean: BONDERITE® C-AK T51 (2% v/v, 49° C., Free Alkalinity (hereinafter "FAlk") 5.0, 90 second spray, 10 psi)
Rinse: City Water (38° C., 60 second spray, 10 psi)
Rinse: DI Water (21° C., 60 second spray, 10 psi)
Conversion Coating: 32° C., 120 seconds immersion
Rinse: DI Water (21° C., 60 seconds spray, 10 psi)
E-coat: BASF CathoGuard 800 (35° C., 240 second immersion, 0.9 Amps constant current~230V)
Rinse: DI Water (24° C., 60 seconds spray, 10 psi)
Paint Cure: Oven bake (185° C., 35 minutes).
Comparative Zinc Phosphate Coating Process (BONDERITE® M-ZN 958)

Pretreated zinc phosphate coated panels purchased from ACT Laboratories, Inc. with total metal phosphate (Hopeite and Phosphophyllite) coating weight of 1.5-2.0 grams per square meter were used.

The zinc phosphate coatings were applied per Henkel Technical Process Bulletin.
Rinse: DI Water (21° C., 60 seconds spray, 10 psi)
E-coat: BASF CathoGuard 800 (35° C., 240 second immersion, 0.9 Amps constant current~230V)
Rinse: DI Water (24° C., 60 seconds spray, 10 psi)
Paint Cure: Oven bake (185° C., 35 minutes).
Glow Discharge Optical Emission Spectroscopy Elemental Depth Profiles were obtained on panels coated according to the invention confirming elements present in the coatings.

Example 2

A conversion coating composition was prepared by combining the following with mixing:
DI water 92.22 wt. %
Bismuth subnitrate; $Bi_5O(OH)_9(NO_3)_4$ 0.58% (0.41 wt. % Bi)
Lactic Acid (88 wt. %) 7.2 wt. %
Mixture's pH=1.97. The mixture described above was added to DI water as follows, which raised the pH to 2.7: DI water 95%, Mixture 5%. The pH was increased using a 10% ammonium bicarbonate solution (BONDERITE® M-AD 700) until pH=3.5 was achieved. This resulted in a clear straw yellow colored solution containing 209 ppm Bi & 3368 ppm lactic acid.

The solution was warmed to 32° C. ACT CRS panels were dip-coated according to the previously described application process using this bismuth conversion coating composition. This resulted in a visibly black coating that contained the elements Bi, O, & Fe.

Example 3

A conversion coating composition was prepared by combining the following with mixing:

DI water 59.95 wt. %
Fluosilicic Acid (25 wt. %) 40.00%
Bismuth oxide; $Bi_2O_3$ 0.05% (0.045 wt. % Bi)
pH=1.10 pH was increased using a 10% ammonium bicarbonate solution (BONDERITE® M-AD 700) until pH=3.5 was achieved. This resulted in a clear colorless solution containing 450 ppm Bi & 10% Fluosilicic acid.

The solution was warmed to 32° C. ACT CRS panels were dip-coated according to the previously described application process using this bismuth conversion coating composition. This resulted in a visibly black coating that contained the elements Bi, O, & Fe.

Example 4

Example 3 was repeated using bismuth subnitrate; $Bi_5O(OH)_9(NO_3)_4$ 0.05% instead of bismuth oxide; $Bi_2O_3$ 0.05%, resulting in a pH=1 mixture. The pH was increased using a 10% ammonium bicarbonate solution (BONDERITE® M-AD 700) until pH=3.5 was achieved. This resulted in a clear colorless solution containing 357 ppm Bi & 10% Huosilicic acid.

The solution was warmed to 32° C. ACT CRS panels were dip-coated according to the previously described application process using this bismuth conversion coating composition. This resulted in a visibly black coating that contained the elements Bi, O, & Fe.

Example 5

Example 3 was repeated using bismuth nitrate; $Bi(NO_3)_3$ 0.05% instead of bismuth oxide; $Bi_2O_3$ 0.05%, resulting in a pH=1.2 mixture. The pH was increased using a 10% ammonium bicarbonate solution (BONDERITE® M-AD 700) until pH=3.5 was achieved. This resulted in a clear colorless solution containing 253 ppm Bi & 10% Fluosilicic acid.

The solution was warmed to 32° C. ACT CRS panels were dip-coated according to the previously described application process using this bismuth conversion coating composition. This resulted in a visibly black coating that contained the elements Bi, O, & Fe.

Example 6

A conversion coating composition was prepared by combining the following with mixing:

DI water 94.25 wt. %
Bismuth oxide; $Bi_2O_3$ 0.5% (0.45 wt. % Bi)
Tartaric Acid 5.25 wt. %

Mixture's pH=1.7. The mixture described above was added to DI water as follows, which raised the pH to 2.7: DI water 95%, Mixture 5%. The pH was increased using a 10% ammonium bicarbonate solution (BONDERITE® M-AD 700) until pH=3.5 was achieved. This resulted in a clear colorless solution containing 224 ppm Bi & 2625 ppm tartaric acid.

The solution was warmed to 32° C. ACT CRS panels were dip-coated according to the previously described application process using this bismuth conversion coating composition. This resulted in a visibly black coating that contained the elements Bi, O, & Fe.

Example 7

A conversion coating composition was prepared by combining the following with mixing:

DI water 94.17 wt. %
Bismuth subnitrate; $Bi_5O(OH)_9(NO_3)_4$ 0.58% (0.41 wt. % Bi)
Tartaric Acid 5.25 wt. %

Mixture's pH=1.7. The mixture described above was added to DI water as follows, which raised the pH to 2.7: DI water 95%, Mixture 5%. The pH was increased using a 10% ammonium bicarbonate solution (BONDERITE® M-AD 700) until pH=3.5 was achieved. This resulted in a clear colorless solution containing 209 ppm Bi & 2625 ppm tartaric acid.

The solution was warmed to 32° C. ACT CRS panels were dip-coated according to the previously described application process using this bismuth conversion coating composition. This resulted in a visibly black coating that contained the elements Bi, O, & Fe.

Example 8

A conversion coating composition was prepared by combining the following with mixing:

DI water 99.30 wt. %
Bismuth nitrate; $Bi(NO_3)_3$ 0.10 wt. %
Fluosilicic Acid (25 wt. %) 0.40%
Tartaric Acid 0.20 wt. %

Mixture's pH=2.0. The pH was increased using a 10% ammonium bicarbonate solution (BONDERITE® M-AD 700) until pH=3.5 was achieved. This resulted in a clear colorless solution containing 506 ppm Bi, 1000 ppm fluosilicic acid & 2000 ppm tartaric acid.

The solution was warmed to 32° C. ACT CRS panels were dip-coated according to the previously described application process using this bismuth conversion coating composition. This resulted in a visibly black coating that contained the elements Bi, C, O, & Fe.

Example 9

A conversion coating composition was prepared by combining the following with mixing:

DI water 99.30 wt. %
Bismuth nitrate; $Bi(NO_3)_3$ 0.10 wt. %
Fluosilicic Acid (25 wt. %) 0.40%
Tartaric Acid 0.20 wt. %
Copper nitrate (1.841% Cu) 0.05%

Mixture's pH=2.0. The pH was increased using a 10% ammonium bicarbonate solution (BONDERITE® M-AD 700) until pH=3.5 was achieved. This resulted in a clear slightly blue/green solution containing 506 ppm Bi, 10 ppm Cu, 1000 ppm fluosilicic acid & 2000 ppm tartaric acid.

The solution was warmed to 32° C. ACT CRS panels were dip-coated according to the previously described application process using this bismuth conversion coating composition. This resulted in a visibly black coating that contained the elements Bi, O, C, Cu & Fe.

Example 10

Example 9 was repeated using Ascorbic Acid 0.20 wt. % instead of Tartaric Acid 0.20 wt. % resulting in a pH=2.0 mixture. The pH was increased using a 10% ammonium bicarbonate solution (BONDERITE® M-AD 700) until pH=3.5 was achieved. This resulted in a clear slightly blue/green) solution containing 506 ppm Bi, 10 ppm Cu, 1000 ppm fluosilicic acid & 2000 ppm ascorbic acid.

The solution was warmed to 32° C. ACT CRS panels were dip-coated according to the previously described application process using this bismuth conversion coating composition. This resulted in a visibly black coating that contained the elements Bi, O, Cu & Fe.

Example 11

A conversion coating composition was prepared by combining the following with mixing:
DI water 99.40 wt. %
Bismuth nitrate; $Bi(NO_3)_3$ 0.10 wt. %
Fluosilicic Acid (25 wt. %) 0.40%
Citric Acid 0.10 wt. %
Copper nitrate (1.841% Cu) 0.05%
Mixture's pH=2.0. The pH was increased using a 10% ammonium bicarbonate solution (BONDERITE® M-AD 700) until pH=3.5 was achieved. This resulted in a clear slightly blue/green) solution containing 506 ppm Bi, 10 ppm Cu, 1000 ppm fluosilicic acid & 1000 ppm citric acid.

The solution was warmed to 32° C. ACT CRS panels were dip-coated according to the previously described application process using this bismuth conversion coating composition. This resulted in a visibly grey/black coating that contained the elements Bi, O, C, Cu & Fe.

Example 12

The following compositions were used to deposit bismuth conversion coatings on bare ACT CRS substrate via the above-described application process with the coating bath at 32° C.:
1. 450 ppm Bi from $Bi_2O_3$, 10% Fluosilicic acid; pH=3.5;
2. 360 ppm Bi from Bismuth subnitrate, 10% Fluosilicic acid; pH=3.5;
3. 250 ppm Bi from Bismuth nitrate, 10% Fluosilicic acid; pH=3.5;
4. 216 ppm Bi from Bismuth subnitrate, 0.3% Lactic acid; pH=3.5;
5. 720 ppm Bi from Bismuth subnitrate, 1000 ppm Fluosilicic acid, 2000 ppm tartaric acid, 10 ppm Cu; pH=3.5.
All five of these bismuth conversion coating compositions deposited dark black Bi-conversion coatings.

The alkaline resistance of these conversion coatings was evaluated via exposure to 0.1M NaOH (pH=12.2) for a four-hour immersion time at a temperature of 21° C. For comparison a bare ACT CRS coated with commercially available zinc phosphate conversion coating (BONDERITE® M-ZN 958) was also evaluated using the same test conditions.

After exposure to NaOH, the panels were rinsed for 30 seconds and air dried using a clean source of compressed air (90 psi). All bismuth coated ACT CRS panels remained black without any evidence of red rust/iron oxidation. The loss of bismuth was approximately 10% of the original weight. The zinc phosphate sample was 100% covered with red rust and significant loss of the zinc phosphate coating (>50% of the original weight was lost). In all cases, the loss of coating was identified using Glow Discharge Optical Emission Spectroscopy Elemental Depth Profiles (GDOES).

Example 13

In this example, different types of ACT metal panels (CRS, EG, HDG and Al6111 panels) were tested. A bismuth conversion coating composition according to Example 9 was made and the pH was increased using a 10% ammonium bicarbonate solution (BONDERITE® M-AD 700) until pH=3.5 was achieved. This resulted in a clear slightly blue/green) solution containing 506 ppm Bi, 10 ppm Cu, 1000 ppm fluosilicic acid & 2000 ppm tartaric acid. The solution was warmed to 32° C. and had a free fluoride of 72 ppm and pH 3.5.

ACT CRS, EG, HDG, & Al6111 panels were dip-coated according to the previously described application process. This resulted in a visibly black coatings on each of the different metal substrate samples. Each of the bismuth conversion coatings contained the elements Bi, O, C, & Cu, as well as metals from their respective base substrates.

Example 14

A conversion coating composition was prepared by combining the following with mixing:
DI water 99.30 wt. %
Fluosilicic Acid (25 wt. %) 0.40%
Tartaric Acid 0.20 wt. %
Bismuth subnitrate; $Bi_5O(OH)_9(NO_3)_4$ 0.07%
Glycoluril resin 200 ppm
Copper nitrate (1.841% Cu) 0.05%
Mixture's pH=1.97. The pH was increased using a 10% ammonium bicarbonate solution (BONDERITE® M-AD 700) until pH=3.5 was achieved. This resulted in a clear slightly blue/green solution containing 506 ppm Bi, 10 ppm Cu, glycoluril resin 200 ppm, 1000 ppm fluosilicic acid & 2000 ppm tartaric acid.

The solution was warmed to 32° C. ACT CRS panels were dip-coated according to the previously described application process using this bismuth conversion coating composition. This resulted in a visibly black coating on the CRS substrate that contained the elements Bi, O, C, Cu & Fe.

Example 15

A conversion coating composition was prepared by combining the following with mixing:
DI water 99.30 wt. %
Fluosilicic Acid (25 wt. %) 0.40%
Tartaric Acid 0.20 wt. %
Bismuth subnitrate; $Bi_5O(OH)_9(NO_3)_4$ 0.07%
Copper nitrate (1.841% Cu) 0.05%
Sodium Nitrobenzenesulfonate, (SNBS) 100 ppm
Mixture's pH=2.08. The pH was increased using a 10% ammonium bicarbonate solution (BONDERITE® M-AD 700) until pH=3.5 was achieved. This resulted in a clear slightly blue/green solution containing 506 ppm Bi, 100 ppm SNBS, 1000 ppm fluosilicic acid & 2000 ppm tartaric acid.

The solution was warmed to 32° C. ACT CRS panels were dip-coated according to the previously described application process using this bismuth conversion coating composition. This resulted in a visibly black coating that contained the elements Bi, O, C, Cu & Fe.

Example 16

In this example, different types of ACT metal panels (CRS, EG, HDG and Al6111 panels) were coated and tested. A conversion coating composition was prepared by combining the following with mixing:

DI water 99.28 wt. %
Bismuth subnitrate; $Bi_5O(OH)_9(NO_3)_4$ 0.07%
Fluosilicic Acid (25 wt. %) 0.40%
Tartaric Acid 0.20 wt. %
Copper nitrate (1.841% Cu) 0.05%

Mixture's pH=2.08. The pH was increased using a 10% ammonium bicarbonate solution (BONDERITE® M-AD 700) until pH=3.5 was achieved. This resulted in a clear slightly blue/green solution containing 506 ppm Bi, 10 ppm Cu, 1000 ppm fluosilicic acid & 2000 ppm tartaric acid. This mixture also contained some undissolved bismuth subnitrate (white solids).

ACT CRS, EG, HDG, & Al6111 panels were dip-coated according to the previously described application process. This resulted in a visibly black coatings on each of the different metal substrate samples. Each of the bismuth conversion coatings contained the elements Bi, O, C, & Cu, as well as metals from their respective base substrates. After the application of the bismuth conversion coating, panels were painted with cathodic electrocoat, BASF CathoGuard 800, without drying or stoppage in the process, according to the parameters set forth above for Bismuth Conversion Coating, E-coat step. Paint application time=4.0 minutes. For comparison purposes, ACT panels coated with commercially available tri-cationic zinc phosphate (BONDERITE® M-ZN 958) were coated in the zinc phosphating process described above including E-coated with BASF CathoGuard 800 using the same paint application parameters.

The E-coat appearance for the bismuth conversion coated panels was smooth and uniform without mapping defects. The cured paint color of bismuth conversion coated panels was visibly darker in color than the zinc phosphate coating control panels. Thickness of the dry E-coat was measured with the bismuth conversion coating providing thicknesses comparable to the zinc phosphate control panels.

TABLE 1

| E-coat Dry-film thickness, mils | | | | |
|---|---|---|---|---|
| | CRS | EG | HDG | Al6111 |
| Bismuth conversion coating | 0.78 | 1.00 | 1.11 | 0.79 |
| Comparative Example Zinc phosphate coating | 0.96 | 0.79 | 0.86 | 1.02 |

Paint Adhesion

Paint adhesion was evaluated using GMW14829/14704. Procedure GMW14704, which included three separate tests: initial cross-hatch, 24 hour water soak followed by cross-hatch, and 48 hour water soak followed by cross-hatch. Each cross-hatch was followed by a tape-pull defined by the General Motors test methods, with higher percentage numbers indicating better performance. Panels were tested in triplicate; different panels were used for 24 hour soak and 48 hour soak tests.

TABLE 2

| | Percent (%) of paint remaining after tape-pull | | |
|---|---|---|---|
| Substrate/Conversion Coat | Initial-No Soak | Post-24 hour Soak | Post-48 hour Soak |
| CRS | | | |
| Bismuth conversion coating | 100 | 95-100 | 99-100 |
| Zinc phosphate coating | 100 | 100 | 100 |
| EG | | | |
| Bismuth conversion coating | 100 | 99-100 | 100 |
| Zinc phosphate coating | 100 | 100 | 100 |
| HDG | | | |
| Bismuth conversion coating | 100 | 99-100 | 95-100 |
| Zinc phosphate coating | 100 | 100 | 100 |
| Al6111 | | | |
| Bismuth conversion coating | 100 | 95-100 | 100 |
| Zinc phosphate coating | 100 | 99-100 | 99-100 |

The paint adhesion on the bismuth coating is comparable the zinc phosphate control.

Corrosion Performance

Cyclic corrosion performance was evaluated using GMW14872, Exposure C (26 cycles, Mass loss=3.892 g). The test cycle is defined by the General Motors test method and includes a series of exposures to humidity, water fog and salt spray. The painted panels were scribed and subjected to 26 cycles. Panels were tested in triplicate.

TABLE 3

| | Corrosion Results, scribe creep (mm), with lower number showing better performance | | | |
|---|---|---|---|---|
| | Conversion Coating | | | |
| Substrate | Zinc Phosphate Maximum | Zinc Phosphate Average | Bismuth Maximum | Bismuth Average |
| CRS | 8.8 | 4.7 | 5.0 | 2.9 |
| EG | 4.9 | 3.4 | 5.6 | 2.0 |
| HDG | 6.0 | 2.9 | 5.5 | 2.5 |
| Al6111 | 0 | 0 | 0 | 0 |

The corrosion resistance of the bismuth coating is comparable to the zinc phosphate control.

Coating weight and thickness of bismuth conversion coating on some unpainted panels was characterized. Average bismuth conversion coating weight, measured as bismuth, was determined using Niton Xl3t (X-ray fluorescence) and coating thickness was determined using Glow Discharge Optical Emission Spectroscopy Elemental Depth (depth profiling):

TABLE 4

| | Bismuth Conversion Coating Measurements | |
|---|---|---|
| Substrate | Average Bismuth Coating Weight (g/m²) | Maximum Bismuth Coating Thickness (nm) |
| CRS | 0.9 | 800 |
| EG | 0.8 | 500 |
| HDG | 0.8 | 500 |
| Al6111 | 0.8 | 250 |

Example 16': Modified Cleaning

Example 16, as described above, was repeated on a second set of ACT panels with the following process changes: the single "Clean" step of 90 second spray with BONDERITE® C-AK T51 was replaced with two sequential "Clean" steps of: 1) 60 second spray, 10 psi with BONDERITE® C-AK T51 followed immediately by 2) 120 second immersion in BONDERITE® C-AK T51. After bismuth conversion coating and rinsing, bismuth conversion coating on some unpainted panels was characterized. Average bismuth conversion coating weight, measured as bismuth, was determined using Niton Xl3t (X-ray fluorescence) and coating thickness was determined using Glow Discharge Optical Emission Spectroscopy Elemental Depth (depth profiling):

TABLE 5

Bismuth Conversion Coating Measurements

| Substrate | Average Bismuth Coating Weight (g/m²) | Maximum Bismuth Coating Thickness (nm) |
|---|---|---|
| CRS | 0.3 | 120 |
| EG | 0.2 | 120 |
| HDG | 0.3 | 120 |
| Al6111 | 0.3 | 200 |

The E-coat appearance for the bismuth conversion coated panels was smooth and uniform without mapping defects. The cured paint color of bismuth conversion coated panels was visibly darker in color than the zinc phosphate coating control panels. Thickness of the dry E-coat was measured with the bismuth conversion coating providing thicknesses comparable to the zinc phosphate control panels.

TABLE 6

E-coat Dry-film thickness, mils

| | CRS | EG | HDG | Al6111 |
|---|---|---|---|---|
| Bismuth conversion coating | 0.70 | 0.90 | 0.80 | 0.70 |
| Comparative Example Zinc phosphate coating | 0.90 | 0.90 | 0.86 | 0.90 |

Corrosion Performance

Example 16' panels were evaluated for cyclic corrosion performance using GMW14872, Exposure C modified to use: (29 cycles, Mass loss=4.065 g).

TABLE 7

Corrosion Results, scribe creep (mm), with lower number showing better performance.

| | Conversion Coating | | | |
|---|---|---|---|---|
| Substrate | Zinc Phosphate Maximum | Zinc Phosphate Average | Bismuth Maximum | Bismuth Average |
| CRS | 7.5 | 3.6 | 5.0 | 3.4 |
| EG | 5.1 | 3.4 | 5.9 | 2.6 |
| HDG | 6.5 | 3.7 | 6.5 | 3.8 |
| Al6111 | 0.6 | 0.1 | 0.6 | 0.1 |

Using a different test, cyclic corrosion performance for Example 16' panels was evaluated using Ford, L-467. The test cycle is defined by the Ford Motor Company test method and includes a series of exposures to humidity, water fog and salt spray. The painted panels were scribed and tested for a 6-week time period. Panels were tested in triplicate.

TABLE 8

Corrosion Results, scribe creep (mm), with lower number showing better performance

| | Conversion Coating | | | |
|---|---|---|---|---|
| Substrate | Zinc Phosphate Maximum | Zinc Phosphate Average | Bismuth Maximum | Bismuth Average |
| CRS | 3.8 | 2.7 | 4.0 | 2.8 |
| EG | 6.0 | 3.9 | 5.7 | 3.3 |
| HDG | 7.4 | 4.5 | 8.0 | 4.5 |

Example 17

Example 16 was repeated using a reduced amount of Tartaric Acid (reduced to 0.108 wt. % from 0.20 wt. %). Mixture pH=2.0. The pH was increased using a 10% ammonium bicarbonate solution (BONDERITE® M-AD 700) until pH=3.5 was achieved. This resulted in a clear slightly blue/green solution containing 506 ppm Bi, 10 ppm Cu, 1000 ppm fluosilicic acid & 1080 ppm tartaric acid. This solution was clear and free from undissolved (visible) solids.

The procedure of Example 16 was followed resulting in ACT CRS, EG, HDG, & Al6111 panels having visibly black coatings on each of the different metal substrate samples. Each of the bismuth conversion coatings contained the elements Bi, O, C, & Cu, as well as metals from their respective base substrates. E-coat appearance was smooth, uniform without mapping defects. The cured paint color of bismuth conversion coated panels was visibly darker in color than the zinc phosphate coating control panels. E-coat dry-film-thickness was comparable between the bismuth coatings and zinc phosphate coating controls. Paint adhesion for zero soak and 48-hour soak, and corrosion resistance testing were performed according to the procedure of Example 16, with the results shown in the tables below.

TABLE 9

Percent (%) of paint remaining after tape-pull

| Substrate/Conversion Coat | Initial-No Soak | Post-48 hour Soak |
|---|---|---|
| CRS | | |
| Bismuth conversion coating | 100 | 100 |
| Zinc phosphate coating | 100 | 98-100 |
| EG | | |
| Bismuth conversion coating | 100 | 0 |
| Zinc phosphate coating | 100 | 100 |
| HDG | | |
| Bismuth conversion coating | 100 | 0 |
| Zinc phosphate coating | 100 | 100 |
| Al6111 | | |
| Bismuth conversion coating | 100 | 99-100 |
| Zinc phosphate coating | 100 | 99-100 |

The paint adhesion on the bismuth coating is comparable the zinc phosphate control, with the exception of EG & HDG substrates.

TABLE 10

Corrosion Results, scribe creep (mm), with
lower number showing better performance

| | Conversion Coating | | | |
| Substrate | Zinc Phosphate Maximum | Zinc Phosphate Average | Bismuth Maximum | Bismuth Average |
|---|---|---|---|---|
| CRS | 10.2 | 5.2 | 5.5 | 3.0 |
| EG | 5.2 | 1.7 | 5.4 | 2.9 |
| HDG | 4.2 | 2.0 | 4.6 | 2.6 |
| Al6111 | 0 | 0 | 0 | 0 |

The corrosion resistance of the bismuth coating is comparable to the zinc phosphate control.

Example 18

Example 16 was repeated using an increased amount of Tartaric Acid (increased to 0.54 wt. % from 0.20 wt. %). Mixture pH=2.0. The pH was increased using a 10% ammonium bicarbonate solution (BONDERITE® M-AD 700) until pH=3.5 was achieved. This resulted in a clear slightly blue/green solution containing 506 ppm Bi, 10 ppm Cu, 1000 ppm fluosilicic acid & 5400 ppm tartaric acid. This solution was clear and free from undissolved (visible) solids.

The procedure of Example 16 was followed resulting in ACT CRS, EG, HDG, & Al6111 panels having visibly black coatings on each of the different metal substrate samples. Each of the bismuth conversion coatings contained the elements Bi, O, C, & Cu, as well as metals from their respective base substrates. The bismuth conversion coating on the CRS substrate was examined using field emission scanning electron microscopy (FESEM) at highest magnification of 100,000×. The bismuth conversion coating deposited on the CRS exhibited a complete substrate-covering layer with a uniform nodular structure. No exposed CRS substrate was observed. E-coat appearance was smooth, uniform without mapping defects. The cured paint color of bismuth conversion coated panels was visibly darker in color than the zinc phosphate coating control panels. E-coat dry-film-thickness was comparable between the bismuth coatings and zinc phosphate coating controls. Paint adhesion for zero soak and 48-hour soak, and corrosion resistance testing were performed according to the procedure of Example 16, with the results shown in the tables below.

TABLE 11

Percent (%) of paint remaining after tape-pull

| Substrate/Conversion Coat | Initial-No Soak | Post-48 hour Soak |
|---|---|---|
| CRS | | |
| Bismuth conversion coating | 100 | 100 |
| Zinc phosphate coating | 100 | 98-100 |
| EG | | |
| Bismuth conversion coating | 100 | 50 |
| Zinc phosphate coating | 100 | 100 |
| HDG | | |
| Bismuth conversion coating | 100 | 95 |
| Zinc phosphate coating | 100 | 100 |

TABLE 11-continued

Percent (%) of paint remaining after tape-pull

| Substrate/Conversion Coat | Initial-No Soak | Post-48 hour Soak |
|---|---|---|
| Al6111 | | |
| Bismuth conversion coating | 100 | 100 |
| Zinc phosphate coating | 100 | 100 |

The paint adhesion on the bismuth coating is comparable to the zinc phosphate control, with the exception of EG substrates.

TABLE 12

Corrosion Results, scribe creep (mm), with
lower number showing better performance

| | Conversion Coating | | | |
| Substrate | Zinc Phosphate Maximum | Zinc Phosphate Average | Bismuth Maximum | Bismuth Average |
|---|---|---|---|---|
| CRS | 10.2 | 5.2 | 4.3 | 3.0 |
| EG | 5.2 | 1.7 | 5.0 | 2.8 |
| HDG | 4.2 | 2.0 | 4.26 | 2.6 |
| Al6111 | 0 | 0 | 0 | 0 |

The corrosion resistance of the bismuth coating is comparable to the zinc phosphate control.

Example 19

Example 16 was repeated using sodium gluconate 0.10 wt. % instead of Tartaric Acid 0.20 wt. % resulting in a pH=2.0 mixture. The pH was increased using a 10% ammonium bicarbonate solution (BONDERITE® M-AD 700) until pH=3.5 was achieved. This resulted in a clear slightly blue/green solution containing 506 ppm Bi, 10 ppm Cu, 1000 ppm fluosilicic acid & 1000 ppm sodium gluconate. This solution was clear and free from undissolved (visible) solids.

The procedure of Example 16 was followed resulting in ACT CRS, EG, HDG, & Al6111 panels having visibly black coatings on each of the different metal substrate samples. Each of the bismuth conversion coatings contained the elements Bi, O, C, & Cu, as well as metals from their respective base substrates.

Example 20

A conversion coating composition was prepared by combining the following with mixing:
   DI water 99.30 wt. %
   Fluosilicic Acid (25 wt. %) 0.40%
   Tartaric Acid 0.20 wt. %
   Bismuth subnitrate; $Bi_5O(OH)_9(NO_3)_4$ 0.07%
   Polyamidoamine resin 0.005%
The polyamidoamine polymeric additive was Versamid 150, commercially available from Gabriel Performance Products, a reaction product of dimerized fatty acid and polyamines, described as having a MW: 200 to 10,000 daltons; amine content: 100 to 1000 mg KOH per gram of resin.

Mixture's pH=2.0. The pH was increased using a 10% ammonium bicarbonate solution (BONDERITE® M-AD 700) until pH=3.5 was achieved. This resulted in a slightly yellow solution containing 506 ppm Bi, 50 ppm polyamidoamine resin, 1000 ppm fluosilicic acid & 2000 ppm tartaric acid. This solution was clear and free from undissolved (visible) solids.

The solution was warmed to 32° C. ACT CRS, EG, HDG, & Al6111 panels were dip-coated according to the previously described application process. This resulted in a visibly black coatings on each of the different metal substrate samples. Each of the bismuth conversion coatings contained the elements Bi, O, & C, as well as metals from their respective base substrates.

Example 21

Example 20 was repeated using Phenalkamine resin 0.005%, a resin based on Cashew Nut Shell Liquid (cardanol, cardol, anacardic acid) and polyamines, MW: =200 to 2,000 daltons; amine content: 100 to 500 mg KOH per gram of resin, commercially available from Cardolite Corporation under the trade name Cardolite NX-8101, instead of Polyamidoamine resin 0.005% resulting in a pH=2.0 mixture. The pH was increased using a 10% ammonium bicarbonate solution (BONDERITE® M-AD 700) until pH=3.5 was achieved. This resulted in a slightly yellow solution containing 506 ppm Bi, 50 ppm Phenalkamine resin, 1000 ppm fluosilicic acid & 2000 ppm tartaric acid. This solution was clear and free from undissolved (visible) solids.

The solution was warmed to 32° C. ACT CRS, EG, HDG, & Al6111 panels were dip-coated according to the previously described application process. This resulted in a visibly black coatings on each of the different metal substrate samples. Each of the bismuth conversion coatings contained the elements Bi, O, & C, as well as metals from their respective base substrates.

Example 22

Example 16 was repeated with the addition of Ludox TMA an aqueous dispersion of colloidal silica (20%) in an amount of 0.025%, commercially available from Grace Materials Technologies, resulting in a pH=2.0 mixture. The pH was increased using a 10% ammonium bicarbonate solution (BONDERITE® M-AD 700) until pH=3.5 was achieved. This resulted in a clear slightly blue/green solution containing 506 ppm Bi, 10 ppm Cu, 50 ppm $SiO_2$, 1000 ppm fluosilicic acid & 2000 ppm tartaric acid. This solution was clear and free from undissolved (visible) solids.

The solution was warmed to 32° C. ACT CRS, EG, HDG, & Al6111 panels were dip-coated according to the previously described application process. This resulted in a visibly black coatings on each of the different metal substrate samples. Each of the bismuth conversion coatings contained the elements Bi, O, C, Si & Cu, as well as metals from their respective base substrates.

Post-Treatment after Bismuth Conversion Coating

Example 23

Zirconium-Containing Post-Treatment

In this example, a zirconium-containing post-treatment was applied to ACT CRS, EG, HDG, & Al6111 panels having a bismuth conversion coating to evaluate compatibility with the bismuth conversion coating layer.

ACT CRS, EG, HDG, & Al6111 panels were dip-coated according to the previously described application process using this bismuth conversion coating composition of Example 16 followed by spray deposition of a zirconium-containing post-treatment according to the below process:

Bismuth Conversion Coating/Post-Treatment Process
    Clean: BONDERITE® C-AK T51 (2% v/v, 49° C., FAlk 5.0, 90 second spray, 10 psi)

Rinse: City Water (38° C., 60 second spray, 10 psi)
Rinse: DI Water (21° C., 60 second spray, 10 psi)
Conversion Coating: 32° C., 120 seconds immersion
Rinse: DI Water (21° C., 60 seconds spray, 10 psi)
Post-Treatment: BONDERITE® M-PT 54 NC, acidic, chrome-free, zirconium-containing passivating post-treatment (0.5% v/v, 21° C., pH=4.0, 60 second spray)
Rinse: DI Water (24° C., 60 seconds spray, 10 psi)
Air dry (ambient temperature, compressed air, 90 psi).

Visibly black coatings were deposited on each of the ACT CRS, EG, HDG, & Al6111 metal substrate samples. Each of the bismuth conversion coatings contained the elements Bi, O, C, & Cu, as well as metals from their respective base substrates. The bismuth conversion coatings were not significantly removed by reaction with the zirconium-containing post-treatment composition indicating that the bismuth conversion coating may be followed by acidic post-treatment.

Example 24: Organic Polymer Sealant

The coating process of Example 23 was repeated using an organic polymer sealant instead of the zirconium-containing post-treatment. The organic polymer seal was applied to ACT CRS, EG, HDG, & Al6111 panels having a bismuth conversion coating to evaluate compatibility with the bismuth conversion coating layer.

ACT CRS, EG, HDG, & Al6111 panels were dip-coated using the bismuth conversion coating composition according to the application process of Example 23, followed by spray deposition of 0.75% v/v BONDERITE® M-PT 99X, an organic polymer sealant using the following parameters: 21° C., pH=4.0, 60 second spray.

Visibly black coatings were deposited on each of the ACT CRS, EG, HDG, & Al6111 metal substrate samples. Each of the bismuth conversion coatings contained the elements Bi, O, C, & Cu, as well as metals from their respective base substrates. The bismuth conversion coatings were not significantly removed by contact with/reaction with the organic polymer sealant composition indicating that the bismuth conversion coating may be suitable for organic polymer sealing, if desired.

Example 24': Organic Polymer Sealant

Example 24, as described above, was repeated on a second set of ACT panels with the following process changes: the single "Clean" step of 90 second spray with BONDERITE® C-AK T51 was replaced with two sequential "Clean" steps of: 1) 60 second spray, 10 psi with BONDERITE® C-AK T51 followed immediately by 2) 120 second immersion in BONDERITE® C-AK T51 and "Air dry" was replaced with "E-coat: BASF CathoGuard 800 (35° C., 270 second immersion, 0.9 Amps constant current~230V), Rinse: DI Water (24° C., 60 seconds spray, 10 psi) and Paint Cure: Oven bake (185° C., 35 minutes).

ACT CRS, EG, HDG, & Al6111 panels were dip-coated as described above. This resulted in a visibly black coatings on each of the different metal substrate samples. Each of the bismuth conversion coatings contained the elements Bi, O, C, & Cu, as well as metals from their respective base substrates. For corrosion performance evaluation panels were painted with cathodic electrocoat, BASF CathoGuard 800, without drying or stoppage in the process, according to the parameters set forth above for Bismuth Conversion Coating, E-coat step. Paint application time=4.5 minutes.

The E-coat appearance for the bismuth conversion coated panels was smooth and uniform without mapping defects. The cured paint color of bismuth conversion coated panels was visibly darker in color than the zinc phosphate coating control panels. Thickness of the dry E-coat was measured with the bismuth conversion coating providing thicknesses comparable to the zinc phosphate control panels.

TABLE 13

| E-coat Dry-film thickness, mils | | | | |
|---|---|---|---|---|
| | CRS | EG | HDG | Al6111 |
| Bismuth conversion coating | 0.80 | 1.10 | 1.00 | 0.80 |
| Comparative Example Zinc phosphate coating | 0.90 | 1.10 | 1.00 | 0.90 |

Corrosion Performance

Example 24' panels were evaluated for cyclic corrosion performance using GMW14872, Exposure C modified to use: (29 cycles, Mass loss=4.065 g).

TABLE 14

| | Corrosion Results, scribe creep (mm), with lower number showing better performance. | | | |
|---|---|---|---|---|
| | Conversion Coating | | | |
| Substrate | Zinc Phosphate Maximum | Zinc Phosphate Average | Bismuth Maximum | Bismuth Average |
| CRS | 7.5 | 3.6 | 4.7 | 2.7 |
| EG | 5.1 | 3.4 | 4.7 | 2.5 |
| HDG | 6.5 | 3.7 | 6.0 | 3.2 |
| Al6111 | 0.6 | 0.1 | 0.0 | 0.0 |

Using a different test, cyclic corrosion performance for Example 24' panels was evaluated using Ford, L-467. The test cycle is defined by the Ford Motor Company test method and includes a series of exposures to humidity, water fog and salt spray. The painted panels were scribed and tested for a 6-week time period. Panels were tested in triplicate.

TABLE 15

| | Corrosion Results, scribe creep (mm), with lower number showing better performance. | | | |
|---|---|---|---|---|
| | Conversion Coating | | | |
| Substrate | Zinc Phosphate Maximum | Zinc Phosphate Average | Bismuth Maximum | Bismuth Average |
| CRS | 3.8 | 2.7 | 3.5 | 2.3 |
| EG | 6.0 | 3.9 | 7.2 | 4.0 |
| HDG | 7.4 | 4.5 | 7.0 | 4.1 |

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An acidic aqueous bismuth conversion coating composition comprising:
   A) dissolved and/or dispersed bismuth;
   B) at least one water-soluble aliphatic organic chelating agent present in an amount sufficient to solubilize or disperse A);
   C) dissolved copper ions; and
   having a pH in a range of from about 2.0 to about 6.

2. The acidic aqueous bismuth conversion coating composition of claim 1, wherein A) comprises at least one of dissolved Bi(III) and dissolved and/or dispersed bismuth compounds; B) comprises one or more water soluble aliphatic organic acids and salts thereof selected from linear, branched or cyclic; saturated or unsaturated, C3-C12 hydroxyl-functionalized carboxylic acids and salts thereof.

3. The acidic aqueous bismuth conversion composition of claim 2, wherein the one or more water soluble aliphatic organic acids and salts thereof comprise at least one organic polycarboxylic acid and salts thereof.

4. The acidic aqueous bismuth conversion coating composition of claim 3, wherein the at least one organic polycarboxylic acid and salts thereof comprises substituted and/or unsubstituted alpha-omega-dicarboxylic acids.

5. The acidic aqueous bismuth conversion coating composition of claim 4, wherein the substituted and/or unsubstituted alpha-omega-dicarboxylic acids and salts thereof comprise one or more of substituted and/or unsubstituted propanedioic acid, butanedioic acid, pentanedioic acid, hexanedioic acid, heptanedioic acid, octanedioic acid, nonanedioic acid, decanedioic acid and salts thereof.

6. The acidic aqueous bismuth conversion coating composition of claim 2, wherein the one or more water soluble organic carboxylic acids and salts thereof comprises tartaric acid and salts thereof.

7. The acidic aqueous bismuth conversion coating composition of claim 1, comprising less than 1 wt. % phosphorus-containing acids and or salts thereof and less than 1 wt. % nickel.

8. The acidic aqueous bismuth conversion coating composition of claim 1, comprising one or more additional components selected from the group consisting of a source of free fluoride, nitrate and Si-based substances wherein the Si-based substances are selected from silanes, colloidal SiO$_2$ and silicates.

9. The acidic aqueous bismuth conversion coating composition of claim 1, wherein the acidic aqueous bismuth conversion coating composition comprises at least one pH adjuster and has a pH of about 2.5 to about 5.0.

10. The acidic aqueous bismuth conversion coating composition of claim 1, wherein the dissolved and/or dispersed bismuth is present in a total concentration of from about 5 to 10,000 ppm.

11. The acidic aqueous bismuth conversion coating composition of claim 1, wherein the dissolved and/or dispersed bismuth comprises one or more of nitrates, oxides and hydroxides of bismuth.

12. The acidic aqueous bismuth conversion coating composition of claim 1, wherein the dissolved and/or dispersed bismuth is selected from bismuth nitrate; bismuth nitrate pentahydrate; bismuth subnitrate; bismuth oxide; bismuth hydroxide and combinations thereof.

13. The acidic aqueous bismuth conversion coating composition of claim 1, wherein the at least one water-soluble organic chelating agent is present in a total concentration of from about 50 to 100,000 ppm.

14. A method of depositing a bismuth conversion coating on a substrate having a metal surface, comprising steps of:

a. contacting a metal surface of a substrate, selected from ferrous metal, zinciferous metal and aluminiferous metal, with the acidic aqueous bismuth conversion coating composition of claim 1 for a time sufficient to form a bismuth conversion coating layer on at least a portion of the metal surface; and b. rinsing the bismuth conversion coating layer with a rinse comprising water.

15. The method of depositing a bismuth conversion coating of claim 14 further comprising a step c) of subjecting at least a portion of the metal surfaces having the bismuth conversion coating layer to a post-treatment and/or sealing rinse prior to painting.

16. The method of claim 15 wherein, a step of painting at least a portion of the metal surfaces having the bismuth conversion coating layer with cathodically depositable electrophoretic-dipcoating and wherein after rinsing step b) and before being coated with the cathodically depositable electrophoretic-dipcoating, the metal surfaces are not dried.

17. A substrate having a metal surface comprising a bismuth conversion coating layer deposited thereon from the acidic aqueous bismuth conversion coating composition of claim 1, wherein the bismuth conversion coating layer comprises bismuth oxide and/or bismuth hydroxide, and further comprises at least one of elemental Cu, Cu(I) and Cu (II).

18. An acidic aqueous bismuth conversion coating composition comprising:

A) 100 to 1000 ppm dissolved and/or dispersed bismuth;

B) a complex fluoroacid, or salt thereof and/or one or more water soluble aliphatic organic acids and salts thereof selected from linear, branched or cyclic; saturated or unsaturated C3-C12 organic acids and salts thereof, present in an amount sufficient to solubilize or disperse A);

C) optionally dissolved copper ions; and at least one pH adjuster, in the form of an acid, base or a buffering acid/base combination present in a quantity sufficient to provide the composition with a pH in a range of from about 2.0-6.0; said composition being capable of producing a conversion coating on CRS that shows no red rusting upon 4 hour immersion in 0.1M NaOH.

19. The acidic aqueous bismuth conversion coating composition of claim 18, wherein the complex fluoroacid comprises fluorosilicic acid present in an amount of 1000 ppm to 100,000 ppm; and/or the aliphatic linear, branched or cyclic; saturated or unsaturated C3-C12 organic acids and salts thereof are hydroxyl-functionalized and present in an amount of 440 ppm to 5400 ppm.

* * * * *